United States Patent [19]

Arai et al.

[11] Patent Number: 5,485,236
[45] Date of Patent: Jan. 16, 1996

[54] CAMERA

[75] Inventors: Akihiro Arai; Hisashi Tatamiya, both of Tokyo, Japan

[73] Assignee: Asahi Kogaku Kogyo Kabushiki Kaisha, Tokyo, Japan

[21] Appl. No.: 175,240

[22] Filed: Dec. 29, 1993

[30] Foreign Application Priority Data

Dec. 29, 1992 [JP] Japan .................................. 4-093806 U
Dec. 17, 1993 [JP] Japan .................................. 5-072648 U

[51] Int. Cl.$^6$ .................................................. G03B 13/32
[52] U.S. Cl. ........................................ 354/195.11; 354/448
[58] Field of Search ............................. 354/400, 195.11, 354/229, 448

[56] References Cited

U.S. PATENT DOCUMENTS

| | | | |
|---|---|---|---|
| 2,662,457 | 12/1953 | Fairbank | 354/229 |
| 3,482,497 | 12/1969 | Ernisse | 354/448 |
| 4,396,267 | 8/1983 | Hirohata et al. | 354/400 |
| 4,508,442 | 4/1985 | Hirohata | 354/400 |
| 4,614,416 | 9/1986 | Suzuki et al. | 354/400 |
| 4,975,725 | 12/1990 | Morisawa . | |
| 5,138,355 | 8/1992 | Morisawa . | |
| 5,144,352 | 9/1992 | Shono . | |
| 5,237,357 | 8/1993 | Morisawa . | |

*Primary Examiner*—Russell E. Adams
*Attorney, Agent, or Firm*—Sandler, Greenblum & Bernstein

[57] ABSTRACT

A camera is provided with an object distance measuring sensor for detecting an object distance, an object brightness measuring sensor for detecting an object brightness, a photographing lens, a position of which along an optical axis is variably set, and a diaphragm mechanism having an aperture value that is variably set. A single movable control member, that is moved in one direction upon a shutter release operation, a first cam for setting the position of the photographing lens in accordance with the movement of the control member, and a second cam for setting the aperture value of the diaphragm mechanism in accordance with the movement of the control member, are also provided. The camera also comprises a stop mechanism for stopping movement of the control member at an arbitrary position, and a control circuit for actuating the stop mechanism so that the control member stops in a position where the position of the photographing lens corresponds to the object distance detected by the object distance measuring sensor, and the aperture value of the diaphragm mechanism corresponds to the object brightness detected by the object brightness measuring sensor when the shutter release operation is executed.

32 Claims, 15 Drawing Sheets

CAMERA

BACKGROUND OF THE INVENTION

The present invention relates to a camera which can adjust the distance between a photographing lens and a film loaded in the camera and an f-number of a diaphragm according to the photographing control condition, and more specifically to a camera in which a simple auto-focusing operation and an auto-exposure operation are accomplished.

Conventionally, a camera includes a shutter mechanism, a diaphragm mechanism and a focusing mechanism etc. that are adjustable. The shutter mechanism, the diaphragm mechanism and the focusing mechanism are adjusted according to a photographing control condition such as object distance, object brightness and film sensitivity. Recently, these mechanism have tended to be automatically adjusted. In order to accomplish the automatic adjustment, the f-number of the diaphragm mechanism is changed by means of an auto-exposure mechanism (i.e., an AE mechanism) according to the object brightness detected by an object brightness measuring sensor, and the distance between the photographing lens and the film is changed by means of an auto-focusing mechanism (i.e., an AF mechanism) according to the object distance detected by an object distance measuring sensor.

However, in the auto-focus mechanism it is necessary to employ a drive mechanism for moving the photographing lens to change the distance between the photographing lens and the film, and in auto-exposure mechanism it is necessary to employ another drive mechanism for changing the size of the diaphragm aperture. These drive mechanisms are relatively expensive to manufacture. Therefore, the cost of the camera tends to increase if both an AE mechanism and an AF mechanism are employed in the camera. Then, it is difficult to make a low-cost camera equipped with both an AE mechanism and an AF mechanism.

SUMMARY OF THE INVENTION

It is therefore an object of the present invention to provide a camera which can provide both an AE mechanism and an AF mechanism at low cost.

It is another object of the present invention to provide a low-cost camera which is provided with a single control plate being common to both an AE mechanism and an AF mechanism.

According to one aspect of the present invention, there is provided a camera which is provided with a detecting mechanism for detecting a plurality of photographing conditions at photographing; a plurality of photographing control means of which a plurality of photographing control values being utilized at photographing are variably set, respectively; a single movable control member which is moved in one direction upon a shutter release operation; a device for setting the photographing control values of the respective photographing control mechanisms in accordance with the movement of the control member; a stop device for stopping the movement of the control member at an arbitrary position; and a control device for actuating the stop device so that the control member stops in a position where the photographing control values of the respective photographing control mechanisms correspond to the photographing conditions detected by the detecting mechanism, respectively, when the shutter release operation is executed.

According to the other aspect of the present invention, there is provided a camera which is provided with a release lever which is moved in one direction upon a shutter release operation; a movable control member which is pressingly contacted to the release lever in the one direction and moved in the one direction within a first moving area and then a second moving area in accordance with the movement of the release lever; a cam which is arranged on the control member and includes a first cam surface for defining a photographing lens in a first position along an optical axis thereof corresponding to a near object and a second cam surface for defining the photographing lens in a second position corresponding to a far object; a rack formed on the control member; a pinion which intermeshes with the rack and is rotated upon the movement of the control member; a diaphragm plate to which the pinion is fixed and which is rotatably supported; a plurality of diaphragm apertures which are formed on the diaphragm plate and which are successively aligned with a photographing aperture upon the rotation of the diaphragm plate; a plurality of latch portions which are formed on the outer periphery of the diaphragm plate and each of which corresponds to a position where each of the diaphragm apertures is aligned with the photographing aperture; a stop device for stopping the rotation of the diaphragm plate by engaging with the corresponding latch portion; a detecting mechanism for detecting at least a distance to an object and a brightness of the object; and a control mechanism for actuating the stop device so that the control member and the diaphragm plate stop in a position where the position of the photographing lens and the aperture value of the diaphragm plate correspond to the distance to the object and the brightness of the object detected by the detecting mechanism, respectively, when the shutter release operation is executed.

The above and other objects, features and advantages of the present invention will become apparent from the following detailed description which is to be read in conjunction with the accompanying drawing.

DESCRIPTION OF THE ACCOMPANYING DRAWINGS

Figure 3:
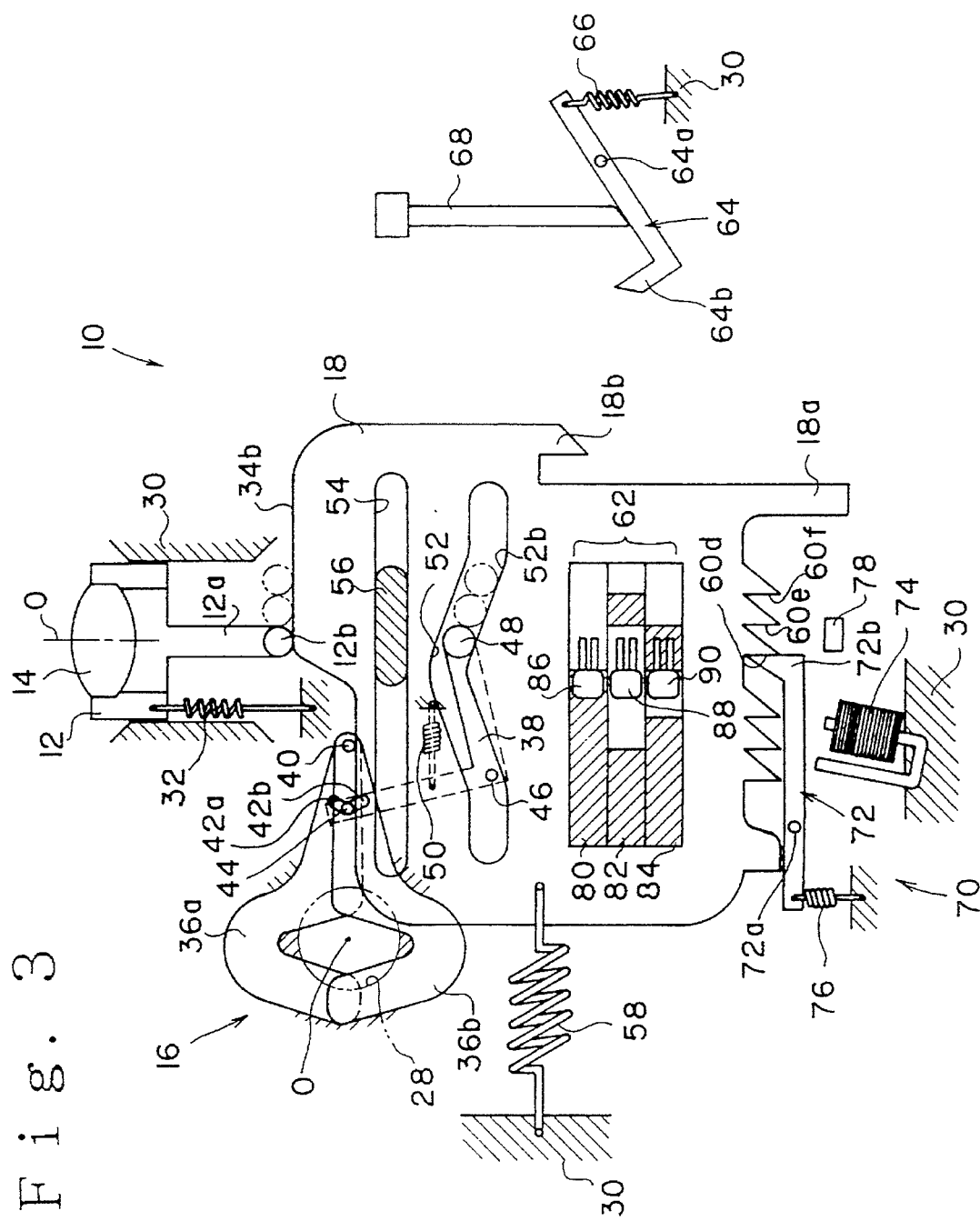
Figure 4:
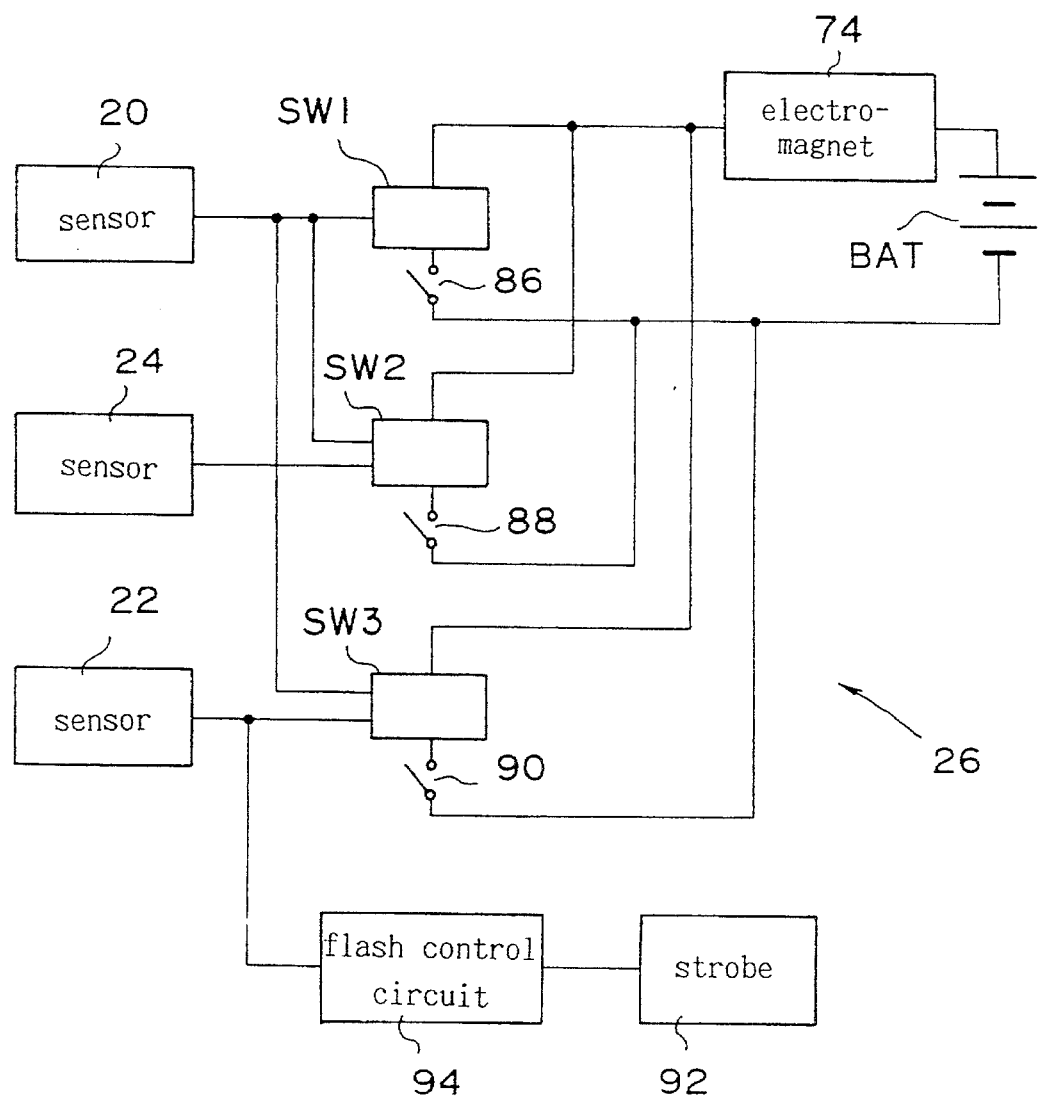
Figure 5:
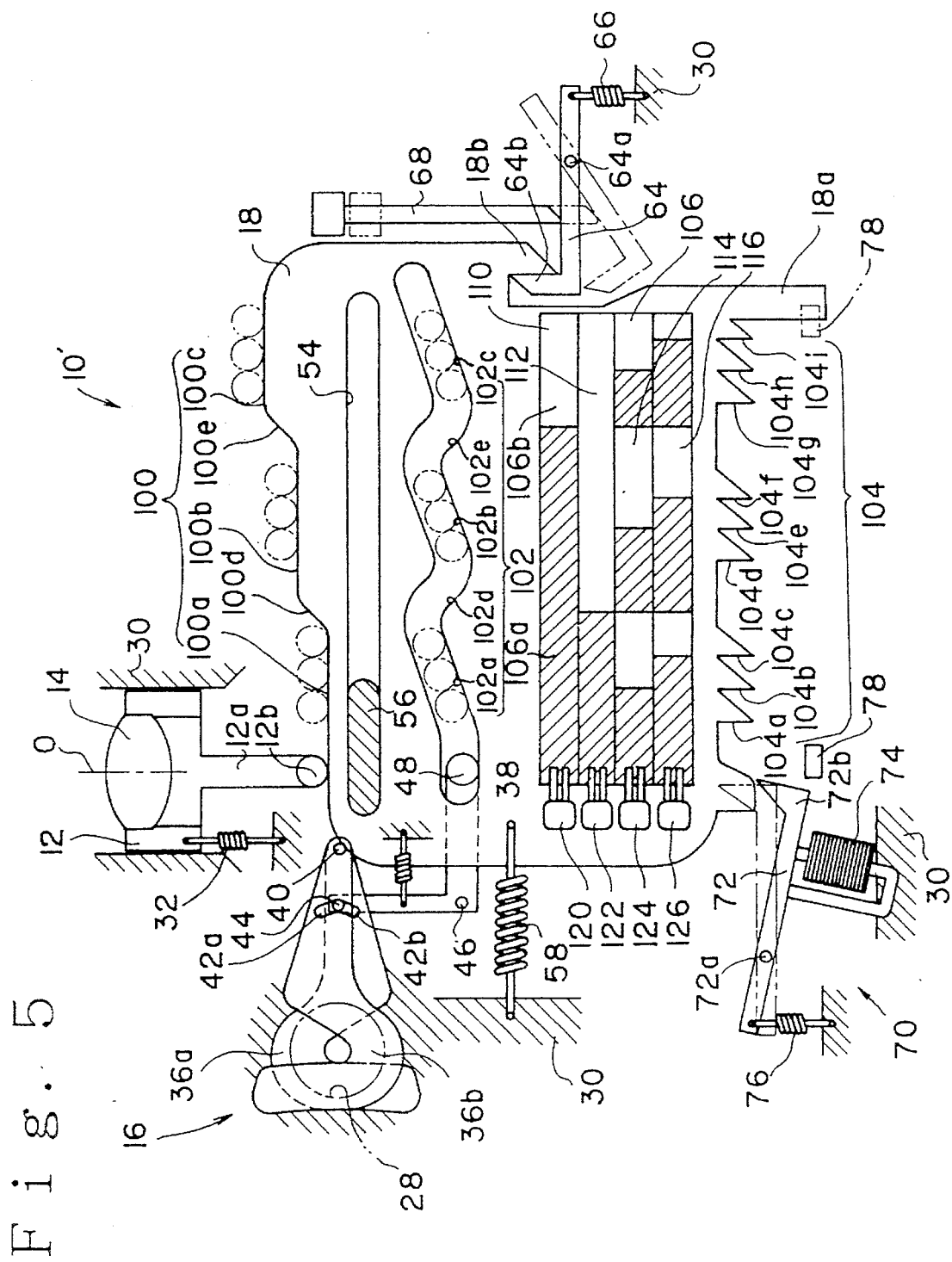
Figure 6:
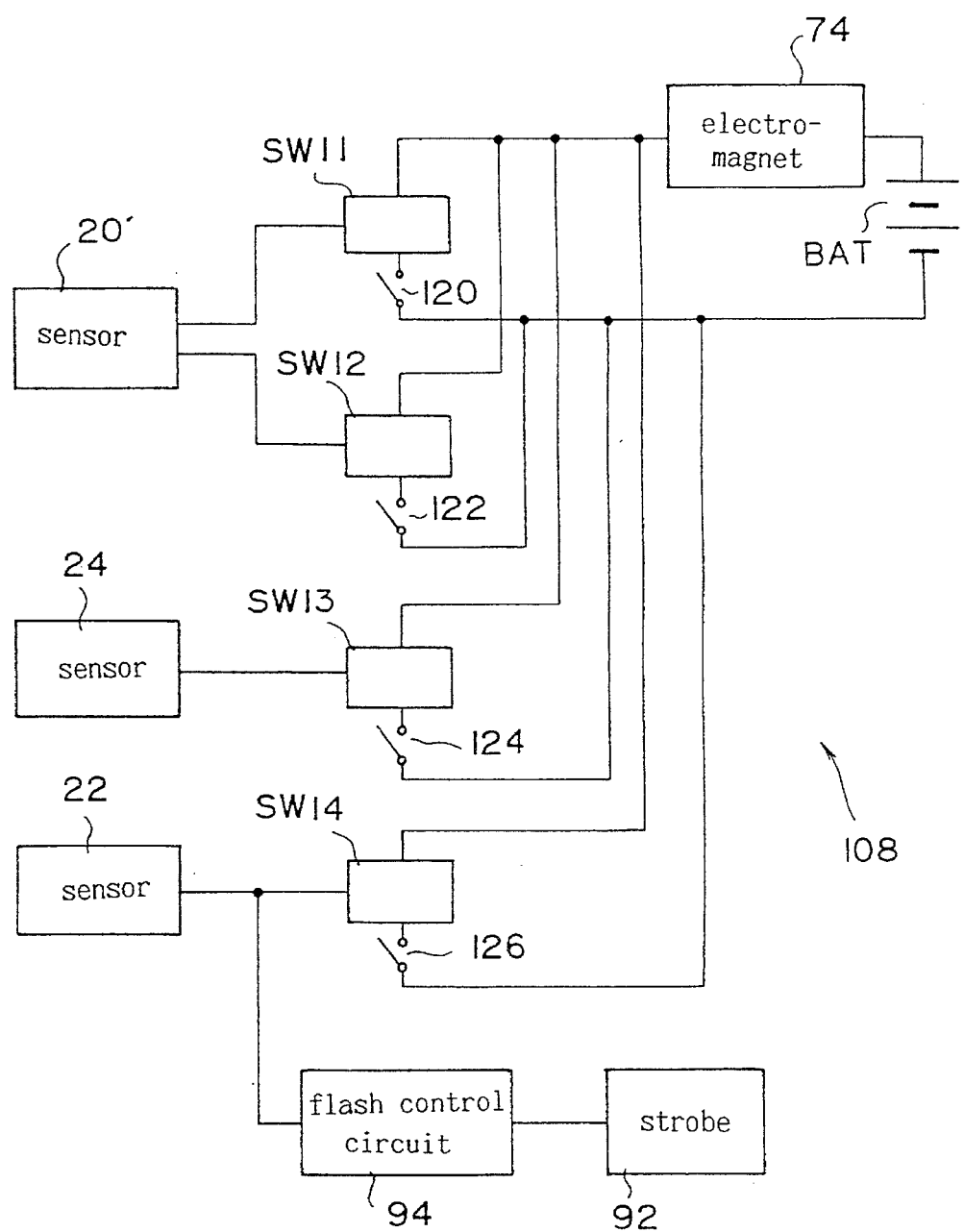
Figure 7:
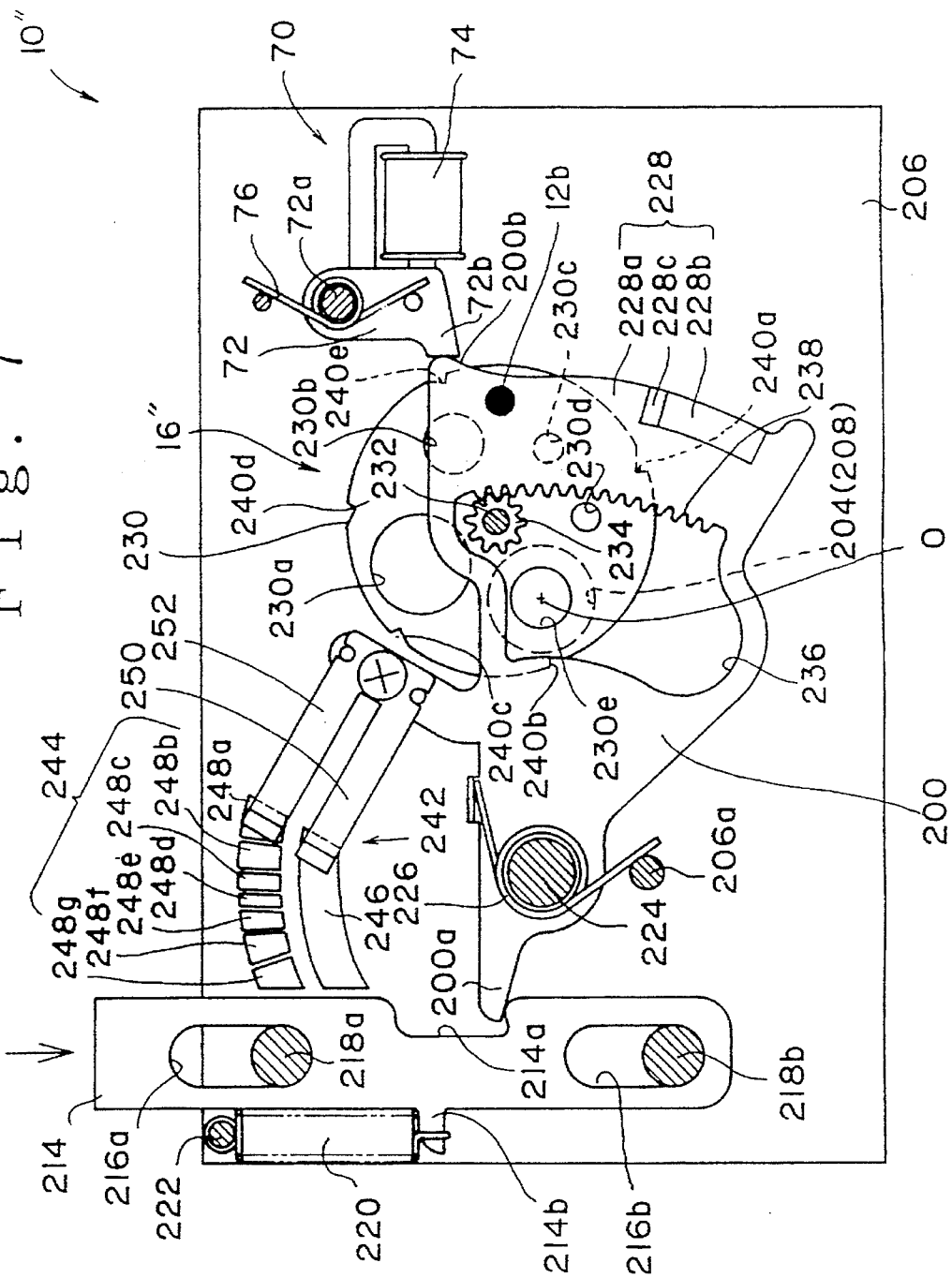
Figure 8:
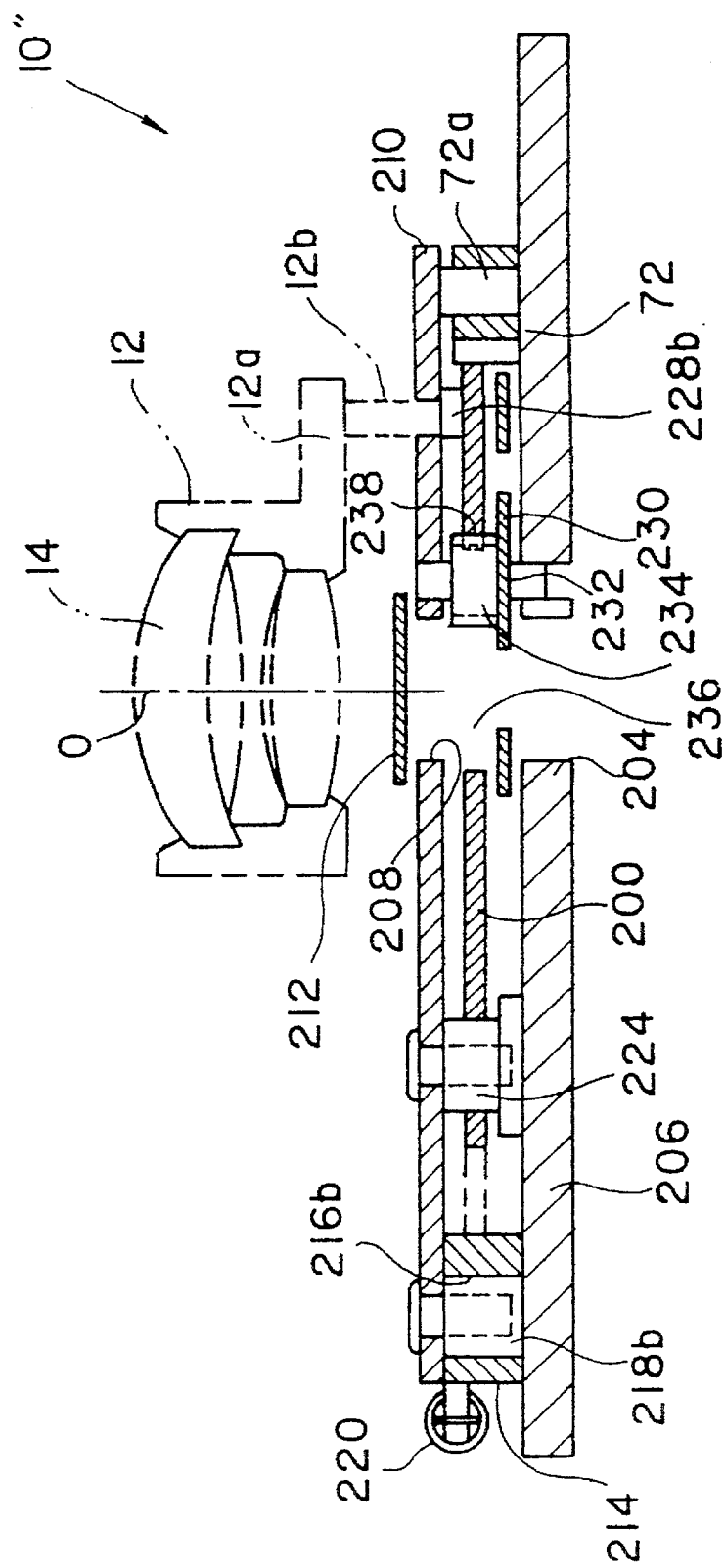
Figure 9:
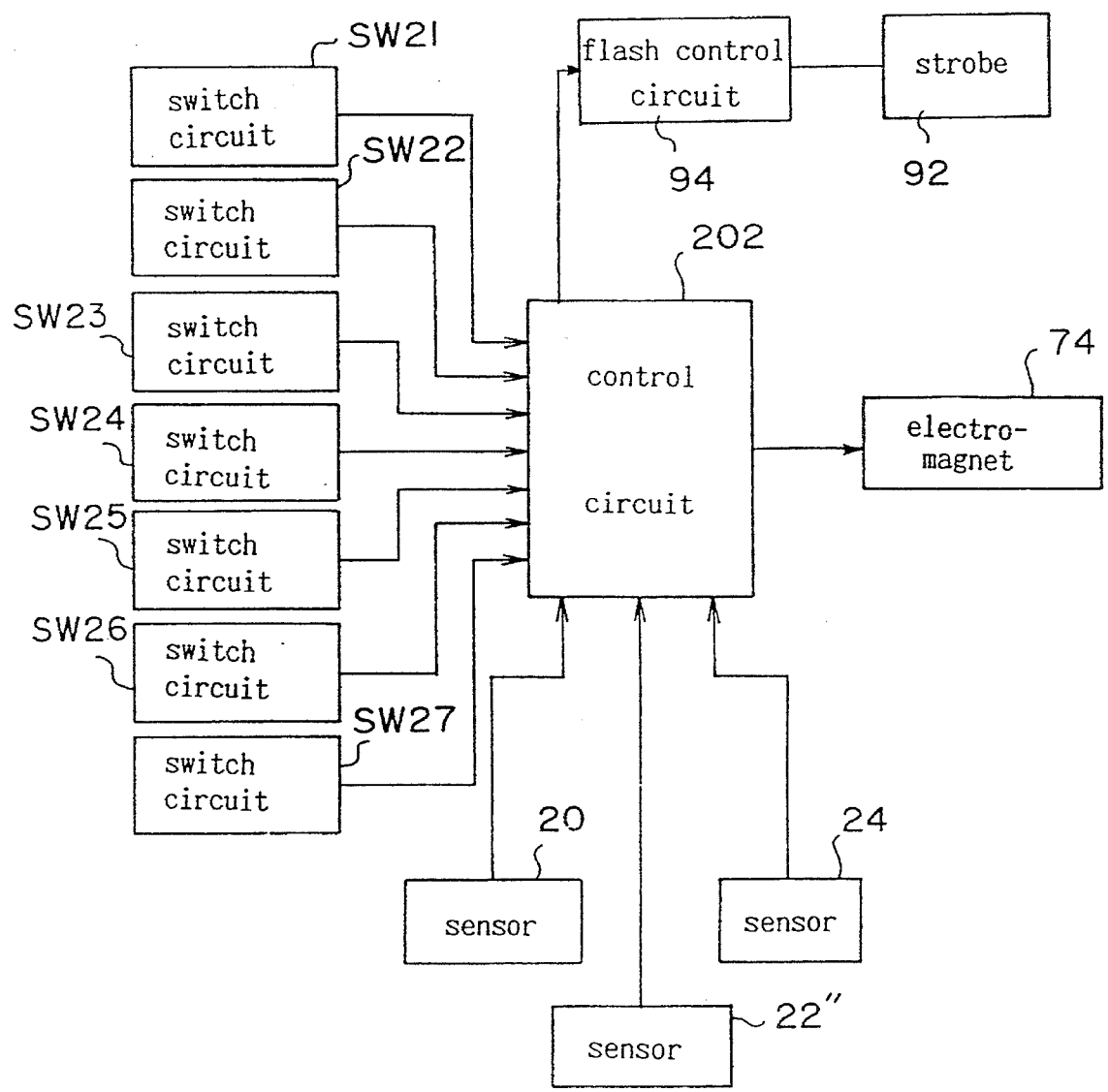
Figure 10:
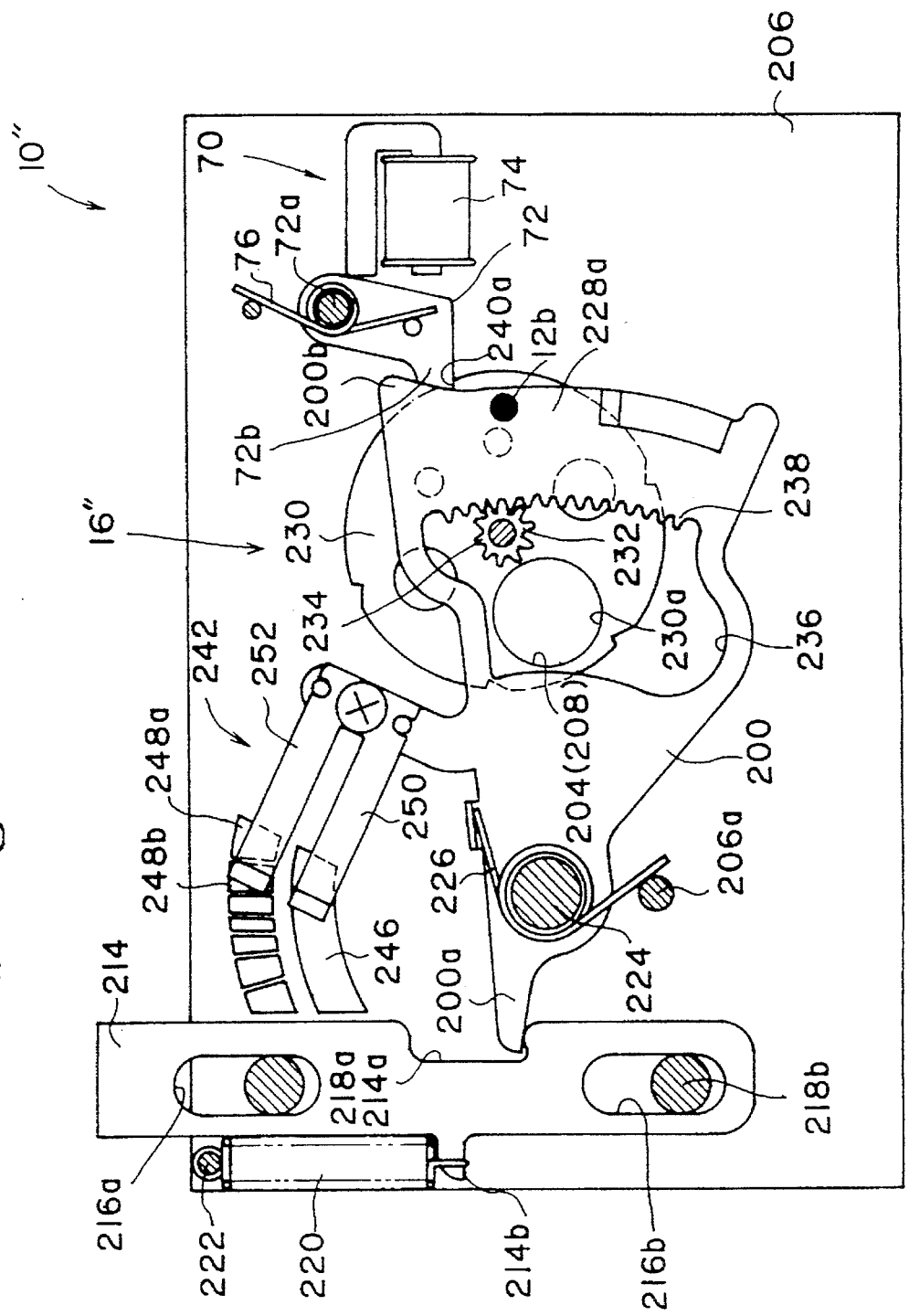
Figure 11:
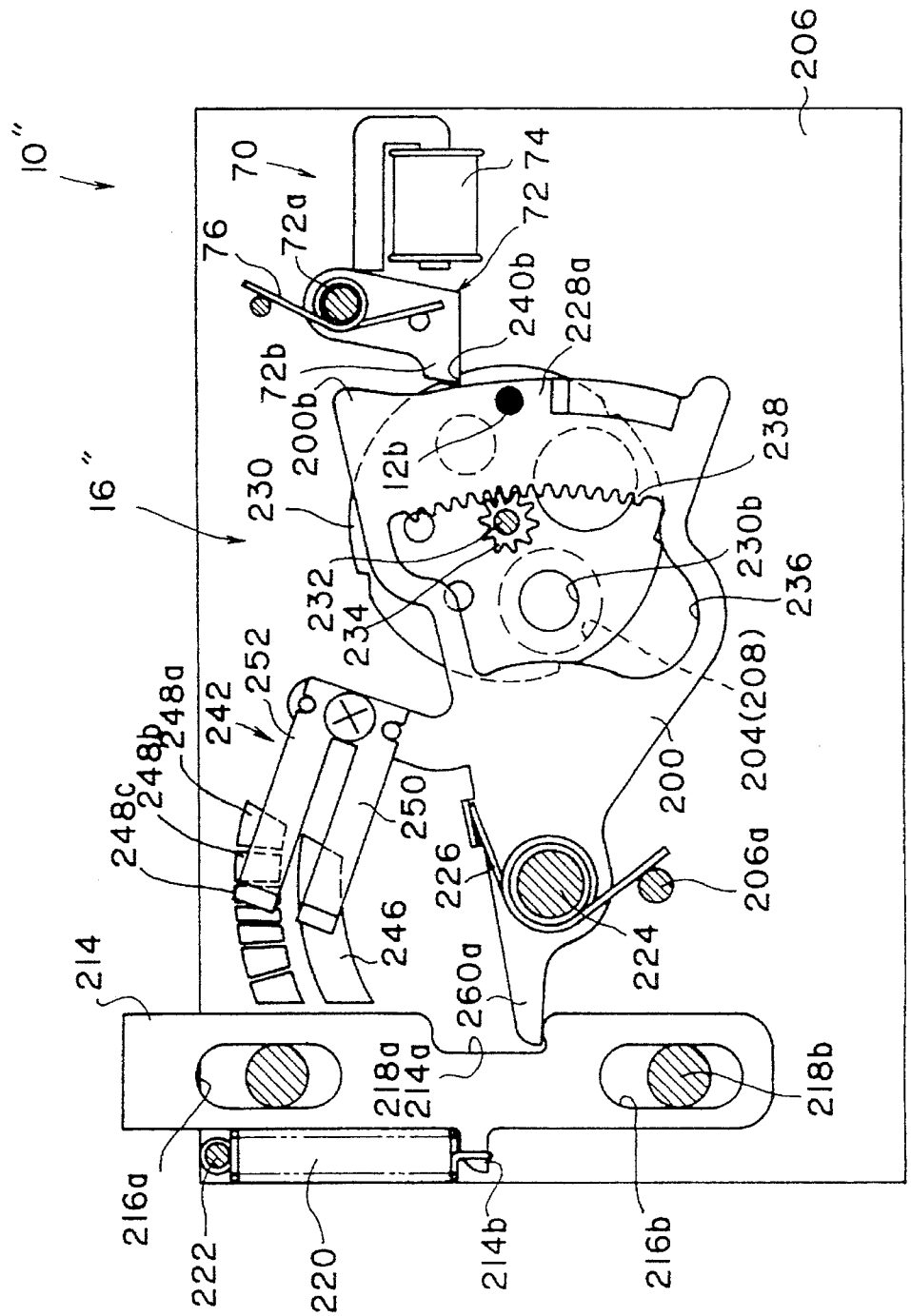
Figure 12:
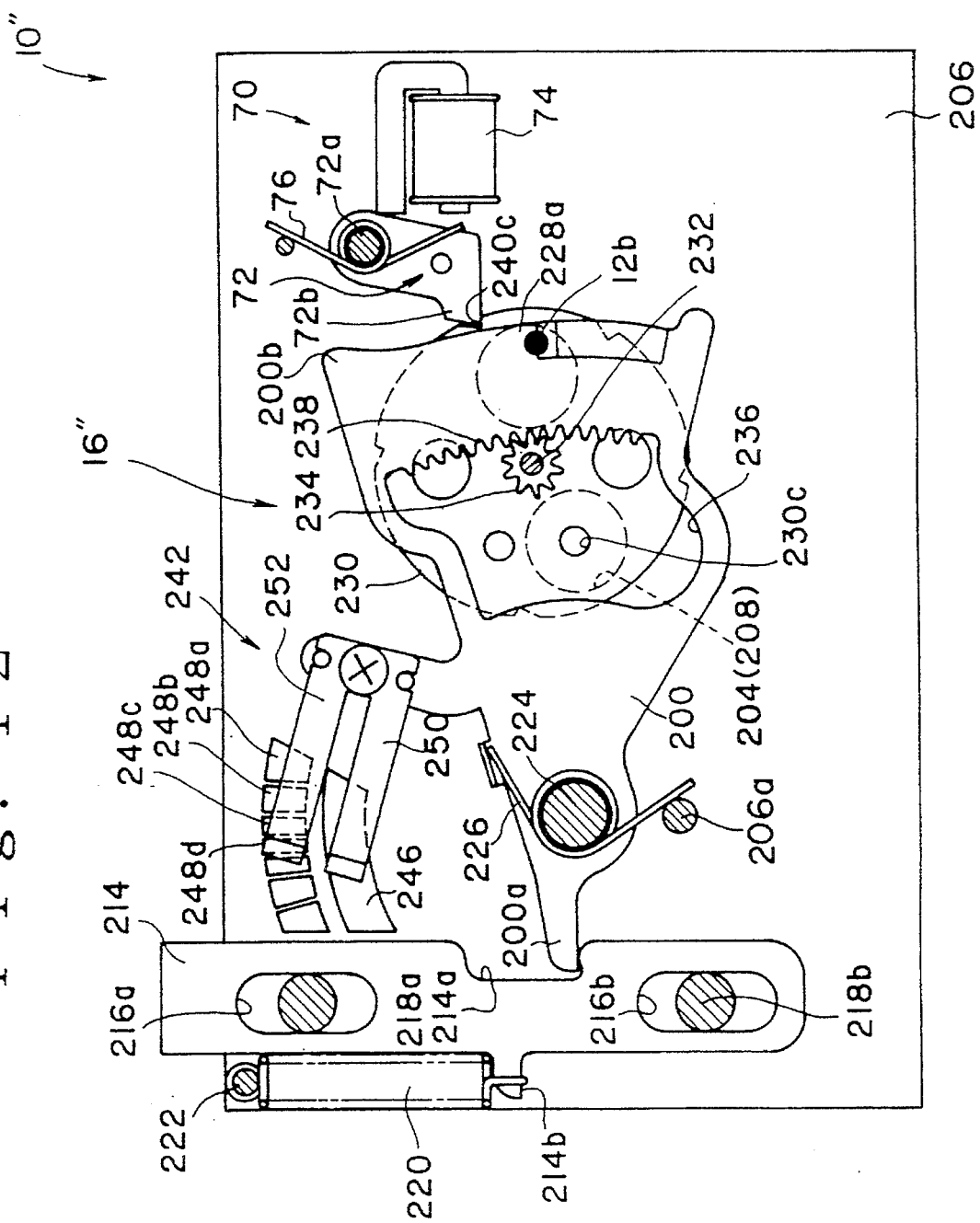
Figure 13:
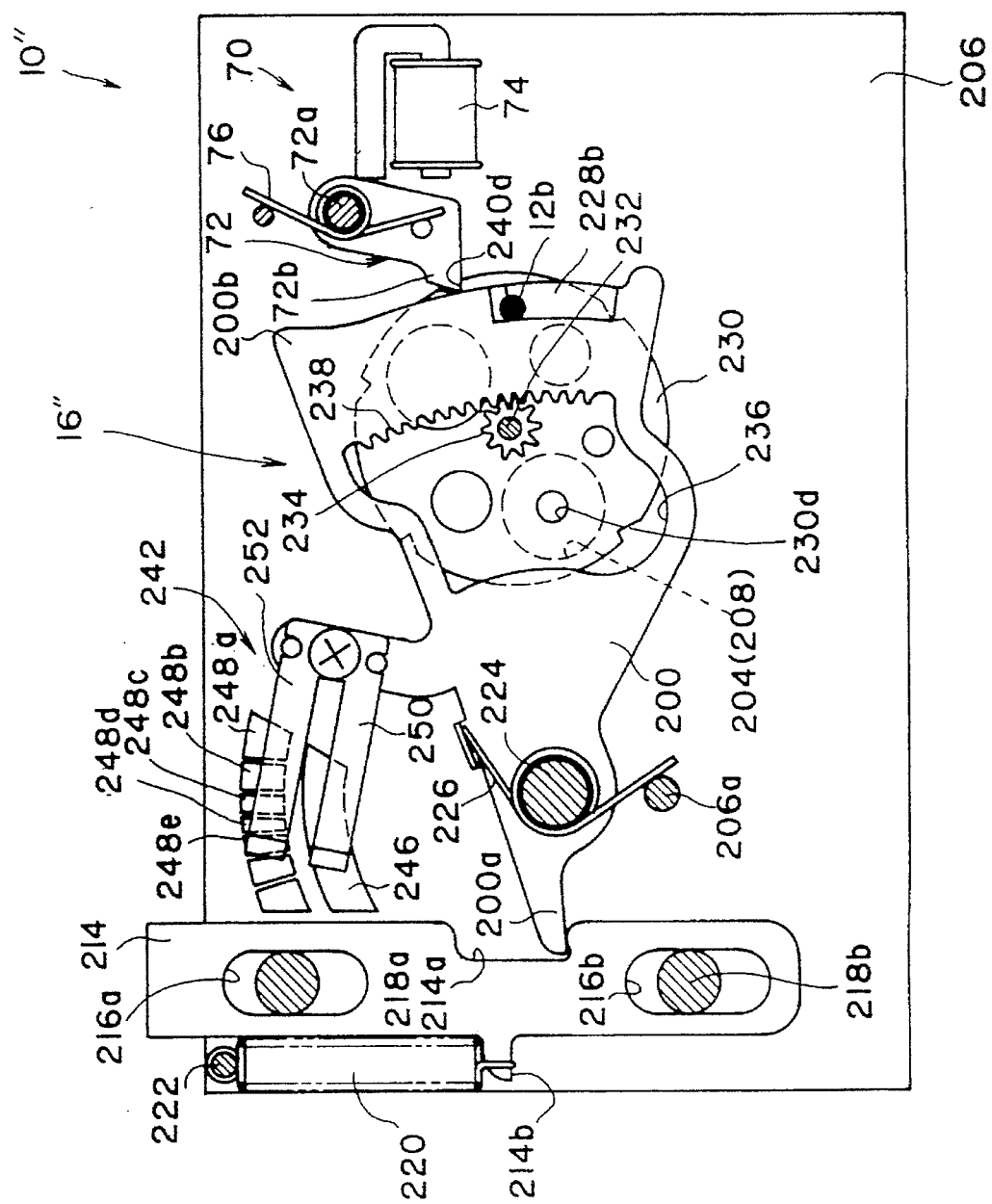
Figure 14:
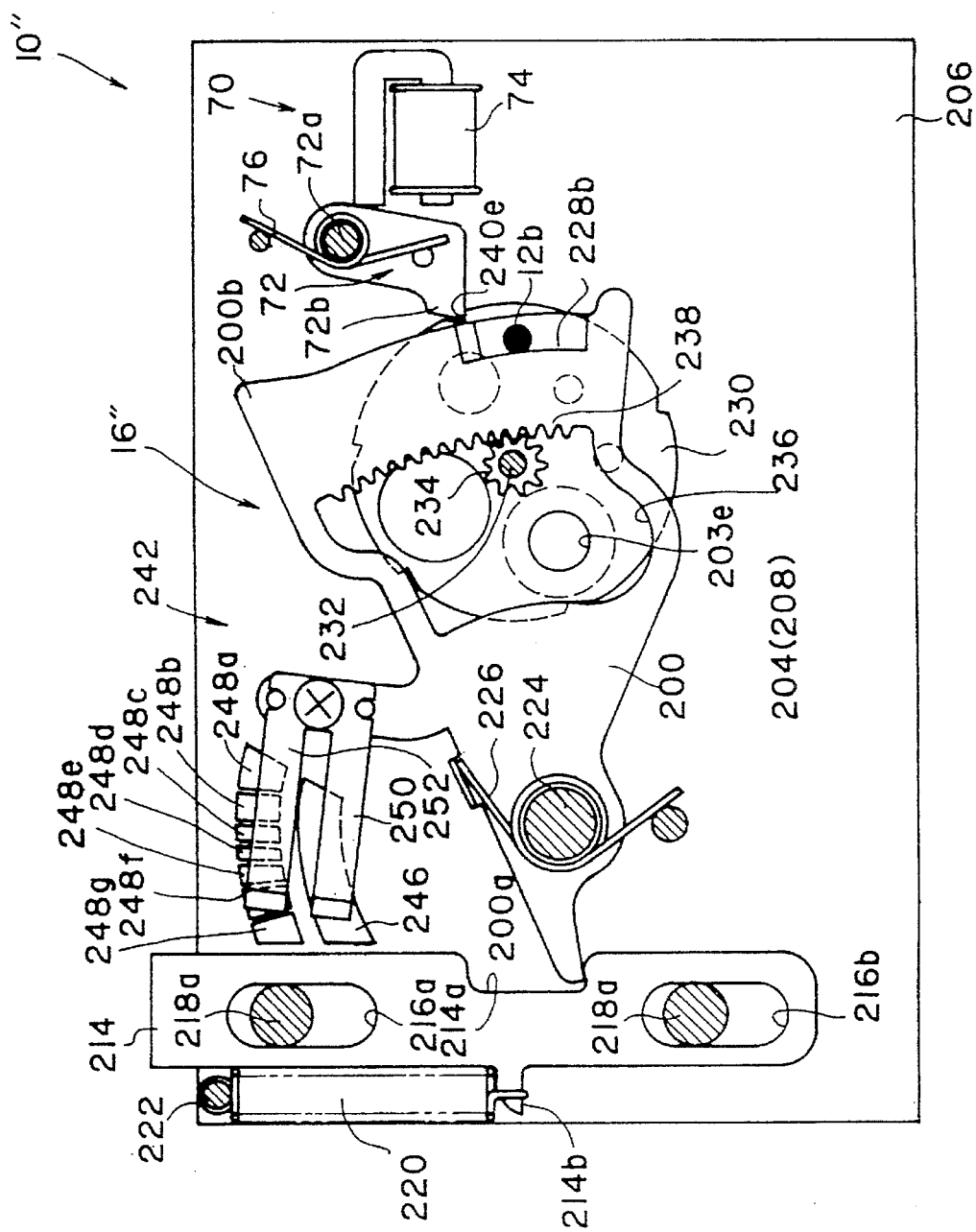
Figure 15:
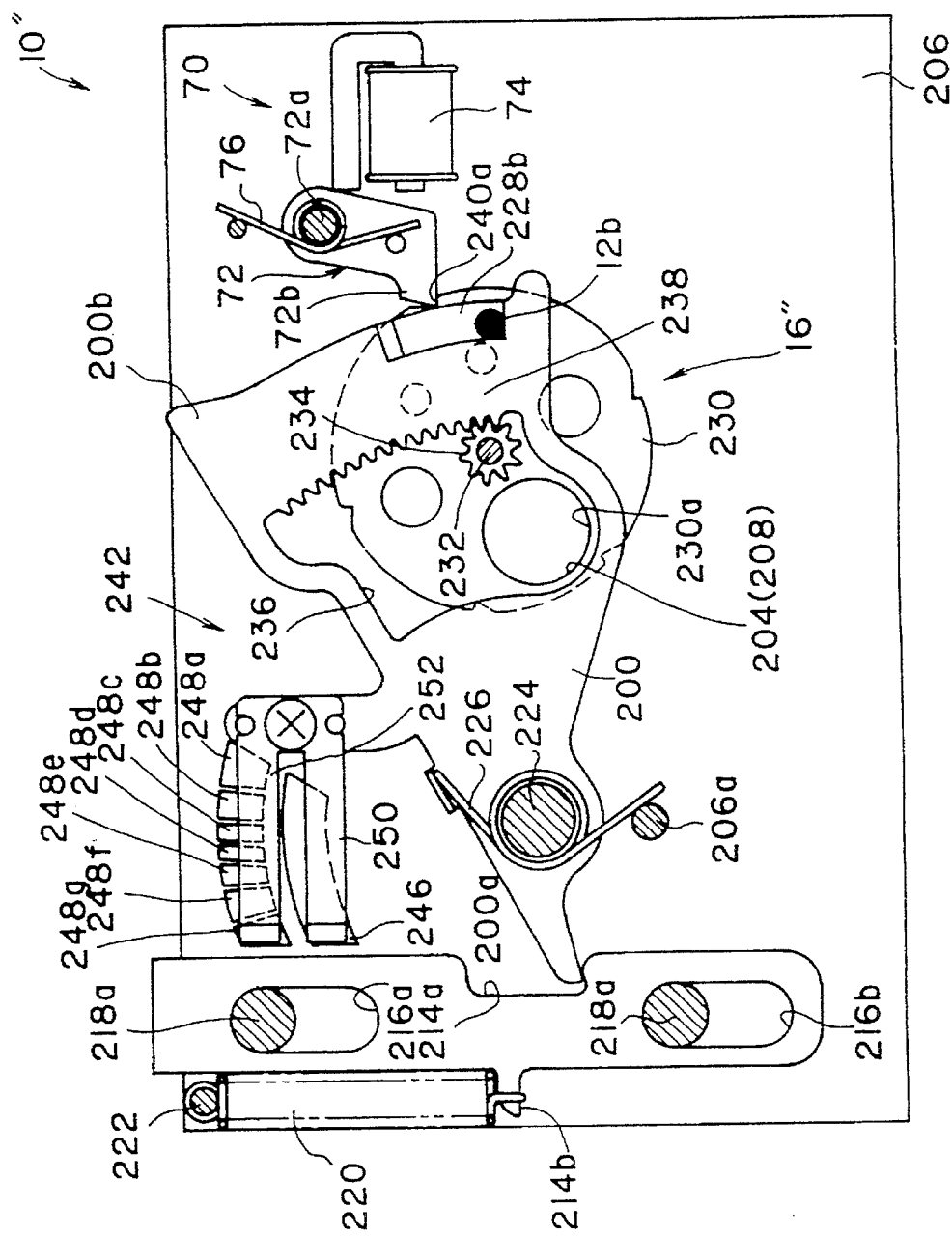

FIG. 3 a construction of the camera of the first embodiment wherein the control plate is stopped at a location where the lens is positioned to focus on an object at a distance of less than '2' meters corresponding to "near object", and a diaphragm mechanism defines an 'f-4' aperture size corresponding to a "dark condition";

FIG. 4 is a block diagram schematically showing a construction of the control circuit of the first embodiment;

FIG. 5 shows a conceptional construction of a camera of a second embodiment according to the present invention wherein a control plate is at its resting position;

FIG. 6 is a block diagram schematically showing a construction of the control circuit of the second embodiment;

FIG. 7 is a front view showing a camera of a third embodiment according to the present invention wherein a control plate is at its resting position;

FIG. 8 is a vertical sectional view showing the camera of the third embodiment;

FIG. 9 is a block diagram schematically showing a construction of the control circuit of the third embodiment;

FIG. 10 is a front view showing the camera of the third embodiment wherein the control plate is stopped at a location where the lens is positioned to focus on an object at a distance of more than '3' meters corresponding to "far object", and a diaphragm mechanism defines an 'f-4' aperture size corresponding to a "dark condition";

FIG. 11 is a front view showing the camera of the third embodiment wherein the control plate is stopped at a location where the lens is positioned to focus on an object at a distance of more than '3' meters corresponding to "far object", and a diaphragm mechanism defines an 'f-8' aperture size corresponding to a "medium condition";

FIG. 12 is a front view showing the camera of the third embodiment wherein the control plate is stopped at a location where the lens is positioned to focus on an object at a distance at a distance of more than '3' meters corresponding to "far object", and a diaphragm mechanism defines an 'f-16' aperture size corresponding to a "bright condition";

FIG. 13 is a front view showing the camera of the third embodiment wherein the control plate is stopped at a location where the lens is positioned to focus on an object at a distance of less than '2' meters corresponding to "near object", and a diaphragm mechanism defines an 'f-16' aperture size corresponding to a "bright condition";

FIG. 14 is a front view showing the camera of the third embodiment wherein the control plate is stopped at a location where the lens is positioned to focus on an object at a distance of less than '2' meters corresponding to "near object", and a diaphragm mechanism defines an 'f-8' aperture size corresponding to a "medium condition"; and FIG. 15 is a front view showing the camera of the third embodiment wherein the control plate is stopped at a location where the lens is positioned to focus on an object at a distance of less than '2' meters corresponding to "near object", and a diaphragm mechanism defines an 'f-4' aperture size corresponding to a "dark condition";

DESCRIPTION OF THE EMBODIMENTS

A first embodiment of a camera according to the present invention will now be described in detail with reference to the accompanying drawings of FIGS. 1 to 4.

Figure 1:
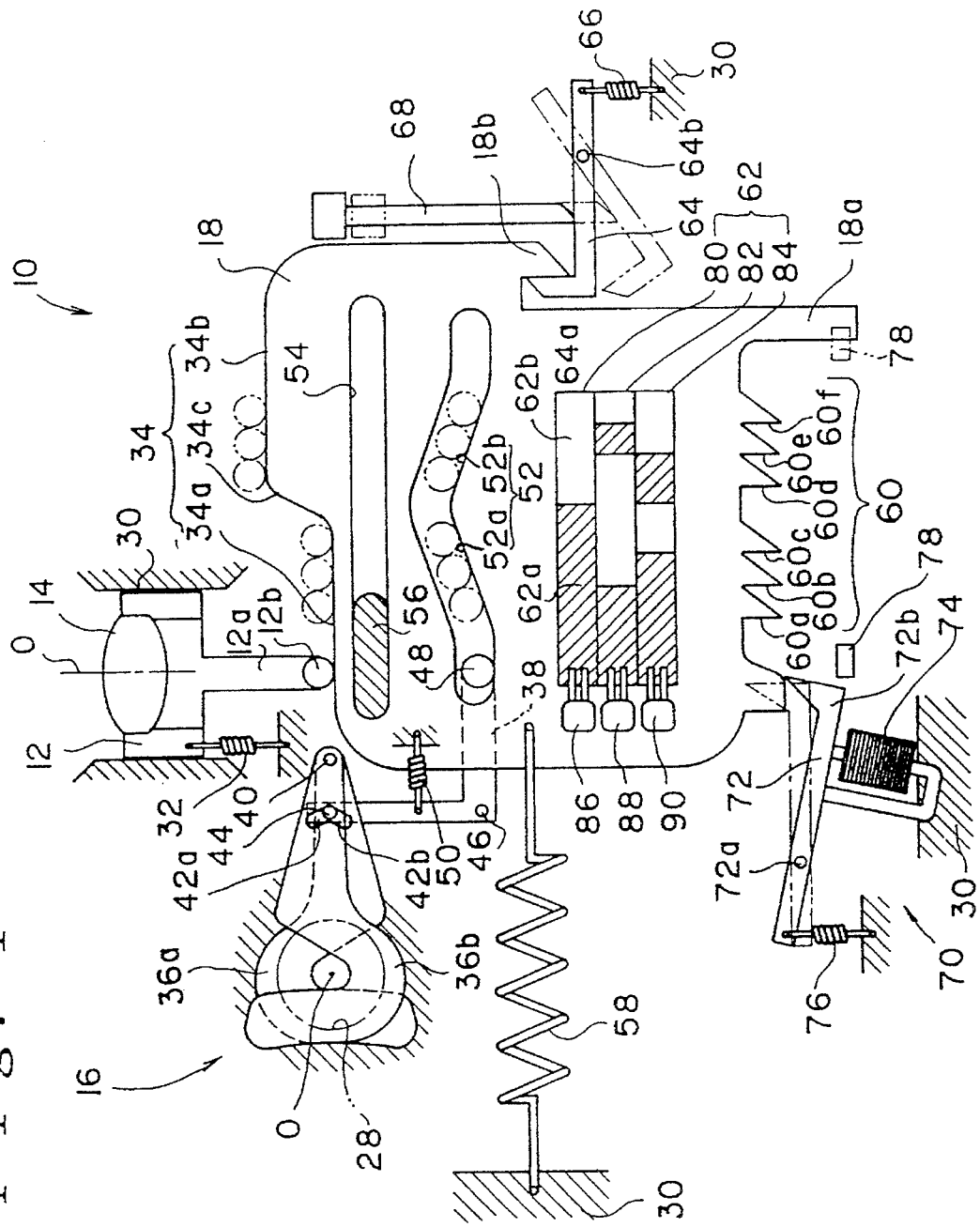
FIG. 1 shows a conceptional construction of a camera of a first embodiment according to the present invention wherein a control plate is at its resting position.

FIG. 1 shows a construction of a camera 10 of the first embodiment according to the present invention. As shown in FIG. 1, the camera 10 of the first embodiment includes a lens shutter (not shown) and a photographing control means which is constructed with a photographing or focus lens 14 received in a lens barrel 12, and a diaphragm mechanism 16.

The camera 10 further includes a single control plate 18 as a single movable control member for adjustably setting both a distance between the lens 14 and a film (in other words, a position of the lens 14 relative to the film) in accordance with the object distance between the object and the film, and an aperture (or aperture-stop) defined by the diaphragm mechanism 16 ill accordance with the brightness of the object and the sensitivity of a film loaded in the camera 10. Thus one moving member (i.e., the single control plate 18) can control the focusing and exposure parameters simultaneously.

In the first embodiment, the distance between the lens 14 and the film is adjustably set to different distance categories such as a "far object" (that is, a long object distance) or a "near object" (that is, a short object distance) by moving the lens 14 along an optical axis 0. Further, the aperture of the diaphragm mechanism 16 is adjustably set to different brightness categories such as a "dark condition", an "intermediate condition" or a "bright condition". These adjustments are executed by a control circuit 26 serving as control means, as shown in FIG. 4, based on information detected by an object distance measuring sensor 20, an object brightness measuring sensor 22, and a film sensitivity detecting sensor 24 as photographing conditions detecting means. The control procedure of the control circuit 26 will be described in detail.

Figure 2:
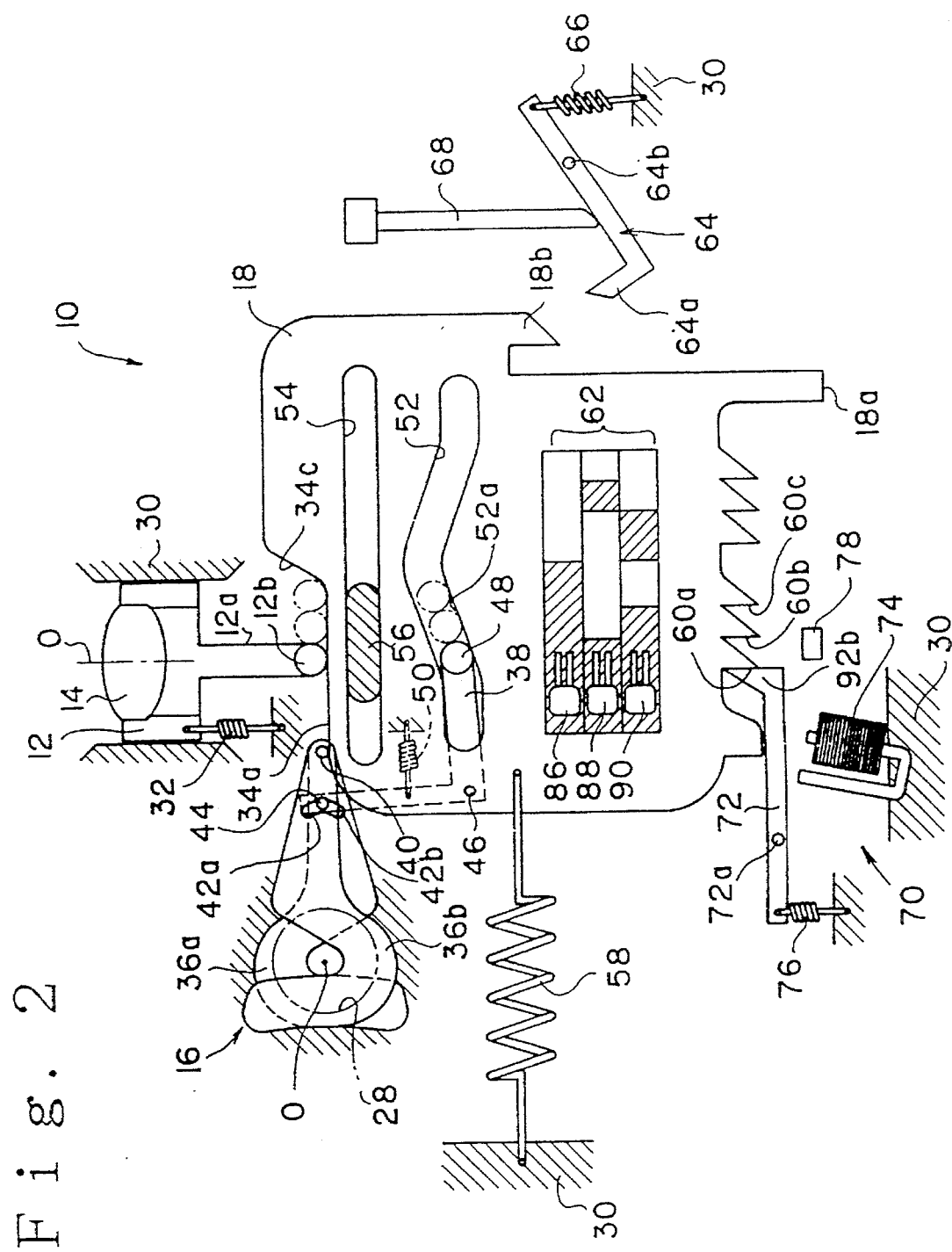
FIG. 2 shows a construction of the camera of the first embodiment wherein the control plate is stopped at a location where the lens is positioned to focus on an object at a distance of more than '3' meters corresponding to "far object", and a diaphragm mechanism defines an 'f-16' aperture size corresponding to a "bright condition"

Please note that the optical axis 0 of the lens 14 is defined as in the vertical direction in FIGS. 1 to 3. Especially, an arm 12a which is attached to the lens barrel 12 and extends rearward from the rear portion of the lens barrel 12 is shown as being extending downwardly from the lens barrel 12 in FIGS. 1 to 3. Also, please note that a perpendicular direction to the optical axis 0 is defined as a lateral direction in FIGS. 1 and 3.

The lens 14 is fixedly provided in the lens barrel 12. The lens barrel 12 is movably attached to a camera body 30 along the optical axis 0 by a predetermined distance. A spring 32 is stretched between the lens barrel 12 and the camera body 30 so that the lens barrel 12 is urged downwardly (that is, in a direction where the lens 14 is to be retracted into the camera body 30) by the urging force of the spring 32. The movement of the lens barrel 12 by means of the urging force of the spring 32 is restricted by a cam follower 12b which is attached to the distal end (that is, the lower end in FIGS. 1, 3 and 4) of the arm 12a that contacts a lens driving cam surface 34 as first cam means formed on the control plate 18.

The diaphragm mechanism 16 includes a pair of diaphragm sectors 36a and 36b for openably closing a photographing aperture 37, and a driving arm 38 for swinging the diaphragm sectors 36a and 36b to define the aperture therebetween. More specifically, the pair of diaphragm sectors 36a and 36b are rotatably supported by a common support shaft 40 to the camera body 30. The aperture defined between the pair of diaphragm sectors 36a and 36b is changed upon the swing thereof. In FIGS. 1 to 3, the central position of the lens aperture defined between the pair of diaphragm sectors 36a and 36b are shown such as being positioned out of the optical axis 0 in FIGS. 1 to 3. However, in actuality the central position of the lens aperture is arranged so as to be coaxial with the optical axis 0.

Elongated slits 42a and 42b are formed in the pair of diaphragm sectors 36a and 36b, respectively. The elongated slits 42a and 42b are slanted with respect to the swinging direction of the respective diaphragm sectors 36a and 36b about the support shaft 40 by a predetermined angle. A drive pin 44 is attached to one end of a diaphragm driving arm 38 (which will be described later in detail). The drive pin 44 is slidably inserted into the overlapping portions of the elongated slits 42a and 42b. The drive pin 44 is moved forwards or away from the support shaft 40, based on the swinging of the driving arm 38 as described later in detail. The diaphragm sectors 36a and 36b are driven to swing about the support shaft 40 through the pair of elongated silts 42a and 42b, according to the movement of the drive pin 44. As a result, the aperture is adjustably changed to obtain a desired f-number.

The driving arm 38 is formed having a substantially L-shape, and swingably supported to the camera body 30 through the support shaft 46 on the bent portion thereof. The drive pin 44 is attached to one end of the driving arm 38 as mentioned above, while a cam follower 48 is attached to the other end of the driving arm 38. A spring 50 is stretched between an arm portion on the side of the drive pin 44 and the camera body 30. The driving arm 38 is urged to be swung in the clockwise direction as shown in the drawings by the urging force of the spring 50. The cam follower 48 is fitted into a diaphragm driving cam groove 52 as a second cam means, and the swinging movement of the driving arm 38 is restricted by the cam profile of the diaphragm driving cam groove 52.

The control plate 18 is formed as substantially rectangular-shaped plate member. A guide groove 54 which extends in a direction perpendicular to the extending direction of the optical axis 0 (that is, laterally in the drawings) is formed on the control plate 18. A guide member 56 is formed to the camera body 30 and slidably fitted into the guide groove 54. Consequently, the control plate 18 can be moved in the extending direction of the guide groove 54 (i.e., laterally in the drawings), and the movement of the control plate 18 is restricted within the extending range of the guide groove 54. A spring 58 is stretched between the left side portion of the control plate 18 and the camera body 30. The control plate 18 is urged to be moved in the left direction in the drawings by the urging force of the spring 58.

The control plate 18 is provided with the lens driving cam surface 34 as the first cam means which is formed on the upper edge portion thereof, and the diaphragm driving cam groove 52 as the second cam means disposed below the guide groove 54. The control plate 18 is further provided with an engaging teeth portion 60 formed on the under edge portion thereof for stopping the movement of the control plate 18, and a code member 62 disposed below the diaphragm driving groove 52 for detecting the position of the control plate 18.

Furthermore, integrally formed at the right side of the control plate 18 is an operation arm portion 18a which extends down as shown in the drawings. Also formed on the right edge portion of the control plate 18 is an engaging pawl 18b which is provided for engaging the control plate 18 in its resting position (that is, a mechanically charged position).

The lens driving cam surface 34 includes a first cam surface portion 34a on the left side in the drawings which is directly defined by an upper surface of the upper edge portion and a second cam surface portion 34b on the right side in the drawings. The second cam surface portion 34b protrudes upwardly from the first cam surface portion 34a (that is, set to be nearer to the lens 14 than the first cam surface portion 34a). The first and second cam surface portions 34a and 34b are smoothly coupled through a coupling surface portion 34c at a substantially central portion of the upper edge portion of the control plate 18. The cam follower 12b is attached to the arm 12a which is extended from the lens barrel 12 and contacts the lens driving cam surface 34.

As a result, when the control plate 18 moves, the lens barrel 12 is moved along the optical axis 0 of the lens 14 (that is, vertically in the drawings) according to the positions where the cam follower 12b contacts the cam surface 34 (that is, according to the contacting position between the cam follower 12b and the first or second cam surface portion 34a or 34b). Consequently, the position of the lens 14 along the optical axis 0 is adjustably changed (or alternatively selected) between a position suitable for photographing an object at a distance of '3' meters or more corresponding to the "far object" and a position suitable for photographing an object at a distance of '2' meters corresponding to the "near object".

The diaphragm driving cam groove 52 includes a first driving cam groove portion 52a which is slanted upward from the left end portion thereof to the central portion thereof at a predetermined gradient as shown in the drawings, and a second driving cam groove portion 52b which is slanted downward from the central portion thereof to the right end portion thereof as shown in the drawings. Thus, the shape of the diaphragm driving cam groove 52 symmetric with respect to the central portion thereof. The cam follower 48 attached to the diaphragm drive arm 38 is slidably fitted into the diaphragm driving cam groove 52.

As a result, when the control plate 18 moves, the diaphragm drive arm 38 is driven to be swung according to how the cam follower 48 moves along the first or second cam groove portion 52a or 52b. Consequently, the pair of diaphragm sectors 36a and 36b are swung about the support shaft 40 according to the swinging of the diaphragm drive arm 38, thereby setting the aperture of the diaphragm mechanism 16 to the given value.

More specifically, the f-number of the aperture defined by the diaphragm mechanism 16 is changed to 'f-16' corresponding to the "bright condition", 'f-8' corresponding to the "intermediate condition", and 'f-4' (that is, the fully opened aperture in the first embodiment) corresponding to the "dark condition", in order mentioned, while the cam follower 48 is slidably moved in the first cam groove portion 52a from the left end portion thereof toward the right side as shown in the drawings. On the other hand, the f-number of the aperture defined by the diaphragm mechanism 16 is changed to 'f-4' corresponding to the "dark condition", 'f-8' corresponding to the "intermediate condition", and 'f-16' corresponding to the "bright condition", in order mentioned, while the cam follower 48 is slidably moved in the second cam groove portion 52b from the left end portion thereof toward the right side as shown in the drawings. The position where the gradient of the diaphragm driving cam groove 52 changes corresponds to the coupling portion 34c of the lens driving cam surface 34.

According to the first embodiment, the f-number of the aperture can be set on 'f-4', 'f-8', and 'f-16' while the position of the lens 14 along the optical axis 0 relative to the film can be set to focus on objects at a distance of '3' meters or more corresponding to "far object", or at a distance of '2' meters or less corresponding to "near object". Any combination of the "3" apertures values and "2" sorts focusing distances can be selected.

The engaging teeth portion 60 is constructed with six teeth 60a to 60f which are formed on the lower edge of the control plate 18 and arranged in the lateral direction as shown in the drawings (that is, in the moving direction of the control plate 18). A latch lever 64 is provided on the right side, in the drawings, of the engaging pawl 18b of the control plate 18, for engaging the control plate 18 in its resting position (or, mechanically charged position) and allowing the movement of the control plate 18 upon a shutter release operation. The latch lever 64 has a latch pawl 64a on one end thereof and rotatably supported to the camera body 30 through a support shaft 64b. A spring 66 is stretched between the latch lever 64 and camera body 30. The latch lever 64 is urged to be rotated in the clockwise direction as shown in the drawings by the urging force of the spring 66.

The latch lever 64 holds the control plate 18 in its home position (or, mechanically charged position) by having the latch pawl 64a engage the engaging pawl 18b of the control plate 18, since the latch lever 64 is rotated in the clockwise direction by the urging force of the spring 66. On the other hand, the latch lever 64 can release the engagement with the engaging pawl 18b of the control plate 18, thereby allowing moving of the control plate 18, when the latch lever 64 is forced to be rotated by a release lever 68 in the counterclockwise direction against the urging force of the spring 66.

More specifically, the release lever 68 is moved by a shutter release button (not shown) and is provided above the latch lever 64. The release lever 68 is supported to the camera body 30 such that it is movable in the vertical direction as shown in the drawings by a predetermined stroke. The lower end of the release lever 68 can contact a portion of the latch lever 64 between the latch pawl 64a and the support shaft 64b.

The release lever 68 is lowered when the shutter is released and contacts the latch lever 64, thereby swinging it in the counterclockwise direction against the urging force of the spring 66. That is to say, when the shutter release operation is initiated, the latch lever 64 is swung against the urging force of the spring 66 by the release lever 68.

A stop mechanism 70 for stopping the movement of the control plate 18 is provided below the control plate 18. The stop mechanism 70 is constructed so as to engage the engaging teeth portion 60 of the control plate 18 which is moving to the left in the drawings upon releasing the engagement between the control plate 18 and the latch lever 64, thereby stopping the movement of the control plate 18 in an arbitrary position corresponding to the predetermined combination of the position of the lens 14 and the aperture value of the diaphragm mechanism 16.

The stop mechanism 70 includes a lock lever 72 which is rotatably supported about a support shaft 72a and an electromagnet 74. The lock lever 72 has a lock pawl 72b on one end thereof. A spring 76 is stretched between the other end of the lock lever 72 and the camera body 30. The lock lever 72 is urged to be rotated in the counterclockwise direction about the support shaft 72a by the urging force of the spring 76.

The electromagnet 74 is fixed to the camera body 30 below the lock lever 72 in the drawings and constructed so that it is controlled to be energized or de-energized by the control circuit 26. Once the electromagnet 74 is energized, the lock lever 72 is attracted by the magnetic force produced in the electromagnet 74 in the clockwise direction in the drawings, thereby being rotated so that the lock pawl 72b is disengaged from the engaging teeth portion 60 against the urging force of the spring 76. On the other hand, once the electromagnet 74 is de-energized, the lock lever 72 is rotated in the counterclockwise direction in the drawings by the urging force of the spring 76 so that the pawl portion 72b is engaged with the engaging teeth portion 60. As a result, when the electromagnet 74 is de-energized, the lock pawl 72b of the lock lever 72 will be engaged with one of six teeth 60a to 60f of the engaging teeth portion 60 formed to the control plate 18, thereby stopping the movement of the control plate 18.

A charge pin 78 is provided at a position where it could contact the operation arm portion 18a of the control plate 18 in the moving direction of the control plate 18. When the film is wound up in the camera body 30 and the shutter mechanism is charged by a charge mechanism (not shown), the charge pin 78 is moved rightward in the drawings in cooperation with the charge mechanism. Consequently, the charge pin 78 contacts the operation arm portion 18a of the control plate 18, and accordingly the control plate 18 is forcibly moved rightwardly in the drawings by the charge pin 78 to its resting position (or, mechanically charged position) against the urging force of the charge spring 58. As a result, once the shutter is charged, the control plate 18 is moved to its resting home position (or, mechanically charged position) shown by an imaginary line, which refers to the position of the charge pin 78 in FIG. 1, against the urging force of the charge spring 58 and is held there while accumulating resilient force in the spring 58 during such movement.

In the camera 10 as constructed above, the control plate 18 is moved to its resting position (or, mechanically charged position) by the charge pin 78 which is moved rightward and which contacts the operation arm portion 18a of the control plate 18 when the shutter is charged and the film is wound up, as shown in FIG. 1. In the resting position (or, mechanically charged position), when the shutter release button (not shown) is depressed by a full stroke, the latch lever 64 is rotated in the counterclockwise direction in the drawings by the release lever 68, to release the engagement between the engaging pawl 18b and the latch pawl 64a, thereby starting the movement of the control plate 18 to the left side in the drawings by the urging force of the spring 58. When the electromagnet 74 is de-energized in the moving operation of the control plate 18, the lock lever 72 is rotated in the clockwise direction by the urging force of the spring 76, thereby engaging the lock pawl 72b of the lock lever 72 with anyone of the six teeth 60a to 60f of the engaging teeth portion 60. As a result, the control plate 18 is stopped in a position which is defined by one of the six teeth 60a to 60f engaged by the lock pawl 72b.

According to the stop position of the control plate 18, a combination of the position of the lens 14 relative to the film and the f-number of the aperture defined by the diaphragm mechanism 16 is defined as mentioned above. The relationship among the stop position of the control plate 18 according to the engaged one of the six teeth 60a to 60f, the position of the lens 14 relative to the film, and the f-number of the aperture is defined in Table 1 as follows.

TABLE 1

|  | positional setting of lens 14 | f-number |
| --- | --- | --- |
| tooth 60a | 3 meters | 16 |
| tooth 60b | 3 meters | 8 |
| tooth 60c | 3 meters | 4 |
| tooth 60d | 2 meters | 4 |
| tooth 60e | 2 meters | 8 |
| tooth 60f | 2 meters | 16 |

Thus, the relationship indicated in Table 1 shows that the control plate 18 can be stopped at one of 6 positions corresponding to the combination of distance of the object from the lens 16 and aperture value.

The stop control of the control plate 18 (that the de-energization control of the electromagnet 74) is executed by the control circuit 26 and three sliding switches 86, 88 and 90 which constitute position detection means for detecting the present position of the control plate 18, as shown in FIG. 4. More specifically, a code member 62 is attached to the control plate 18, to represent the present position of the control plate 18. The code member 62 is constructed by three rows of switch plates 80, 82 and 84 each of which has electrically conductive portions 62a and electrically insulating portions 62b in a different pattern from each other. The three rows of switch plates 80, 82 and 84 are disposed below the diaphragm driving cam groove 52 and extend parallel to the moving direction of the control plate 18 (or, the lateral direction in the drawings).

The three sliding switches 86, 88 and 90 slidingly contact the three rows of the switch plates 80, 82 and 84 of the code member 62, respectively. The sliding switches 86, 88 and 90 are fixed to the camera body 30 and arranged vertically and in parallel to each other. Each of the sliding switches 86, 88 and 90 has a pair of contact terminals which are capable of contacting the corresponding switch plate 80, 82 or 84. When the pair of contact terminals of each of the sliding switch 86, 88 or 90 contact the electrically conductive portion 62a of the corresponding switch plate 80, 82 and 84, the electrical continuity between the pair of contact terminals is established (that is, the sliding switch 86, 88 or 90 is turned on). When the pair of contact terminals of each of the sliding switch 86, 88 or 90 contact the electrically insulating portion 62b of the corresponding switch plate 80, 82 and 84, the electrical continuity between the pair of contact terminals is not established (that is, the sliding switch 86, 88 or 90 is turned off).

Thus, each of sliding switches 86, 88 and 90 is turned on and/or off according to the stop position of the control plate 18. The code member 62 is formed so that three sliding switches 86, 88 and 90 are turned on/off in pattern different from each other as shown in Table 2 as follows.

TABLE 2

|  | sliding switch 86 | sliding switch 88 | sliding switch 90 |
| --- | --- | --- | --- |
| tooth 60a | ON | ON | ON |
| tooth 60b | ON | OFF | ON |
| tooth 60c | ON | OFF | OFF |
| tooth 60d | OFF | OFF | ON |
| tooth 60e | OFF | ON | OFF |
| tooth 60f | OFF | OFF | OFF |

Accordingly, it is possible to determine the present position of the control plate 18 by detecting the on/off state of each of the sliding switches 86, 88 and 90.

FIG. 4 is a block diagram schematically showing a circuit construction of the control circuit 26 of the first embodiment. The control circuit 26 is constructed so as to energize or de-energize the electromagnet 74 in order to stop the control plate 18 at a predetermined position. The control circuit 26 includes a strobe control circuit 94 for controlling the flash of a strobe 92 which is provided in the camera body 30, and first to third switch circuits SW1 to SW3 to be described later in detail. The object distance measuring sensor 20, the object brightness measuring sensor 22, and the film sensitivity detecting sensor 24 as well as the first to third sliding switches 86, 88 and 90 are connected to the control circuit 26.

The object distance measuring sensor 20 is a known active-type AF sensor which detects the object distance, and determines a "near object" when the object distance is less than '2.4' meters or a "far object" when the object distance is equal to or more than '2.4' meters. The sensor 20 is connected to the first to third switch circuits SW1 to SW3 and sends the determined object distance. The object brightness measuring sensor 22 detects the brightness of the object and determines a "dark object" when the object brightness is less than EV 10 or a "bright object" when the object brightness is equal to or more than EV 10. The sensor 22 is connected to the third switch circuit SW3 and the strobe control circuit 94 and sends the determined object brightness thereto. The film sensitivity detecting sensor 24 detects the sensitivity or speed of the film loaded in the camera body 30 and determines a "low sensitive film" when the film sensitivity is equal to or less than ISO 320 or a "high sensitive film" when the film sensitivity is equal to or more than ISO 400. The sensor 24 is connected to the second switch circuit SW2 and sends the determined film sensitivity thereto.

First to third switch sections to be described later in detail are used to provide a simple logic function that controls the energization of the electromagnet 74 based on the output of the sensors 20, 22 and 24 and the sliding switches 86, 88 and 90. The object distance measuring sensor 20 has two output states, one represents a "near object" while the other represents a "far object". Similarly, the object brightness measuring sensor 22 has two output states, one represents a "bright object" while the other represents a "dark object". Further, the film sensitivity detecting sensor 24 also has two output states, one represents a "high film speed" greater than ISO 400 while the other represents a "low film speed" less than ISO 320.

The first switch section consists of the first switch circuit SW1 in series with the first sliding switch 86. The first switch circuit SW1 is set to be turned off if the sensor 20 outputs a "far object", while it is turned on if the sensor 20 outputs a "near object". Thus, the first switch section is turned off if one or both of the first switch circuit SW1 or the first sliding switch 86 are turned off. Similarly the second switch section consists of the second switch circuit SW2 in series with the second sliding switch 88. The second switch circuit SW2 is set to be turned off if the sensor 20 outputs a "far object" and the sensor 24 outputs a "high sensitive film" or if the sensor 20 outputs a "near object" and the sensor 24 outputs a "low sensitive film", while be turned on if the sensor 20 outputs a "far object" and the sensor 24 outputs a "low sensitive film" or if the sensor 20 outputs a"near object" and the sensor 24 outputs a "high sensitive film". Thus, the second switch section is turned off if one or both of the second switch circuit SW2 or the second sliding switch 88 are turned off. Further, the third switch section consists of the third switch circuit SW3 in series with the third sliding switch 90. The third switch circuit SW3 is set to be turned off if the sensor 20 outputs a "far object" and the sensor 22 outputs a "bright object" or if the sensor 20 outputs a "near object" and the sensor 22 outputs a "dark object", while be turned on if the sensor 20 outputs a "near object" and the sensor 22 outputs a "bright object" or if the sensor 20 outputs a "far object" and the sensor 22 outputs a "dark object". Thus, the third switch section is turned off if one or both of the third switch circuit SW3 or the third sliding switch 90 are turned off.

The three switch sections are connected in parallel across the battery (BAT) and electromagnet 74, which are connected in series. Thus the connection between the battery (BAT) and the electromagnet 74 is interrupted only if all three switch sections are turned off. Thus, If at least one switch section is turned on, the electromagnet 74 will remain energized.

The strobe 92 is flashed under the control of the strobe control circuit 94 when the shutter mechanism is actuated to accomplish the exposure. More specifically, the strobe control circuit 94 causes the strobe 92 to flash when the sensor 22 outputs a "dark object", while it inhibits the strobe 92 from flashing when the sensor 22 outputs a "bright object".

When the code plate 62 is moved from the right to the left in accordance with the movement of the control plate 18, the sliding switches 86, 88 and 90 will change state. Table 3 shows the state of the switches for different positions of the lock pawl 72b with respect to the teeth 60a through 60f.

TABLE 3

|  | 1st switch section | | 2nd switch section | | 3rd switch section | |
| --- | --- | --- | --- | --- | --- | --- |
|  | SW1 | 86 | SW2 | 88 | SW3 | 90 |
| tooth 60a | OFF | ON | OFF | ON | OFF | ON |
| tooth 60b | OFF | ON | ON | OFF | OFF | ON |
| tooth 60c | OFF | ON | — | OFF | ON | OFF |
| tooth 60d | ON | OFF | — | OFF | OFF | ON |
| tooth 60e | ON | OFF | OFF | ON | ON | OFF |
| tooth 60f | ON | OFF | ON | OFF | ON | OFF |

Next the general operation of the camera 10 will be described.

At first, the control plate 18 is moved rightward as shown in the drawings, by the charge pin 78, during the wind operation of the film, and is latched in its resting position (or mechanically charged position). In this position, when an operator depresses the shutter release button (not shown) by half a stroke, the sensors 20, 22 and 24 detect the object distance, ambient light and film speed, respectively. Simultaneously, the electromagnet 74 is energized so that the lock lever 72 rotates in the clockwise direction against the urging force of the spring 76. This disengages the lock pawl 72b being separated from the engaging portion 60.

Then the switch circuits SW1, SW2, and SW3 are set based on the information output by the sensors 20, 22 and 24 as described above.

Further depression of the shutter release button (not shown) results in the release lever 68 being lowered, contacting the latch lever 64. The latch lever 64 is thus rotated about the supporting shaft 64b such that latch pawl 64a is disengaged from engaging pawl 18b. The control plate 18 is then moved to the left by the urging force of spring 58.

The control plate 18 moves to the left until it is stopped by the engagement of the lock pawl 72b and one of the teeth 60a through 60f of the engaging teeth portion 60. Thus the electromagnet 74 must be de-energized in order that the above mentioned locking operation can occur.

As mentioned above, the electromagnet 74 is de-energized when all of the first through third switch sections are turned off. Therefore at least one of the switches of each of the switch sections must be turned off, if the electromagnet 74 is to be de-energized. The switch circuits SW1, SW2 and SW3 are set to have values that depend on the output of the sensors 20, 22 and 24 as described above. Each row of Table 3 represents a different combination of object distance, object brightness and film speed that can be output by the three sensors 20, 22 and 24. Thus as the control plate 18 moves, the sliding switches 86, 88 and 90 will change state. When the control plate 18 is at a position that either the first sliding switch 86 or the first switch circuit SW1 is turned off and either the second sliding switch 88 or the second switch circuit SW2 is turned off and either the third sliding switch 90 or the third switch circuit SW3 is turned off, the electromagnet 74 will be de-energized, the lock lever 72 will rotate counter-clockwise and thus the locking pawl 72b will engage one of the teeth 60a through 60f, stopping the movement of the control plate 18.

The movement of the control plate 18 results in movement of the cam followers 48 and 12b and thus the diaphragm size and distance of the lens 14 from the film plane will be changed.

Table 3 represents the relationship between the values of the first to third switch circuits SW1, SW2 and SW3 and the first to third sliding switches 86, 88 and 90 in order to de-energize the electromagnet 74. The tooth number for each row is the tooth that the locking pawl 72b will engage when the electromagnet 74 is de-energized according to the setting of the first to third switch sections.

Table 4 shows the relationship between the teeth (and thus the position where the control plate 18 is locked after the release of the shutter) and the object distance, object brightness and film sensitivity.

TABLE 4

|  | detected object distance | detected film sensitivity | detected object brightness |
| --- | --- | --- | --- |
| tooth 60a | $\geq 2.4$ (m) | $\geq$ ISO 400 | $\geq$ EV 10 |
| tooth 60b | $\geq 2.4$ (m) | $\leq$ ISO 320 | $\geq$ EV 10 |
| tooth 60c | $\geq 2.4$ (m) | — | < EV 10 |
| tooth 60d | < 2.4 (m) | — | < EV 10 |
| tooth 60e | < 2.4 (m) | $\leq$ ISO 320 | $\geq$ EV 10 |
| tooth 60f | < 2.4 (m) | $\geq$ ISO 400 | $\geq$ EV 10 |

Hereinafter, the specific operation of the camera 10 will be described in detail.

At first, a case wherein the real object distance is 5 meters, the real object brightness is EV 14, and the real film sensitivity of the film loaded in the camera body 30 is ISO 400 is considered. In this case, the object distance measuring sensor 20 determines a "far object" because the real object distance is more than '2.4' meters, the object brightness measuring sensor 22 determines a "bright object" because the real object brightness is more than EV 10, and the film sensitivity detecting sensor 24 determines a "high sensitive film" because the real film sensitivity is equal to ISO 400.

Accordingly, the first switch circuit SW1 is turned OFF because the sensor 20 indicates a "far object", the second switch circuit SW2 is turned OFF because the sensors 20 and 24 indicate a "far object and high sensitive film", and the third switch circuit SW3 is turned OFF because the sensors 20 and 22 indicate a "far and bright object". As a result, all of the first to third switch circuits are turned OFF thereby de-energizing the electromagnet 74, to rotate the lock lever 72 in the counterclockwise direction by the urging force of the spring 76 and to set the lock pawl 72b of the lock lever 72 to capable of abutting to or engaging with the first tooth 60a of the engaging teeth portion 60 before the release lever 68 is depressed or the control plate 18 starts to move.

Once the latching of the control plate 18 by the latch lever 64 is released by the descent of the release lever 68 according to the depression of the shutter release button (not shown), the control plate 18 starts to move leftward in the drawings by the urging force of the spring 58. As shown in FIG. 2, when the first tooth 60a of the engaging teeth portion 60 abuts to or engages with the lock pawl 72b of the lock lever 72, the movement of the control plate 18 is stopped. In this stopped condition, the cam follower 12b contacts the first cam surface portion 34a of the lens driving cam surface 34 while the cam follower 48 stops at a position in the first cam groove portion 52a of the diaphragm driving cam groove 52 which corresponds to 'f-16' of the diaphragm mechanism 16.

As a result, the lens 14 is stayed in the position which is suitable for focusing an object at a distance of '3' meters or more corresponding to the "far object", the diaphragm sectors 36a and 36b of the diaphragm mechanism 16 are rotated to the position which defines the size of the aperture to 'f-16' corresponding to the "bright condition", and the strobe control circuit 92 inhibits the flash of the strobe 92. Thereafter, the exposure to the film is executed by the shutter mechanism (not shown).

Secondly, a case wherein the real object distance is 5 meters, the real object brightness is EV 14, and the real film sensitivity of the film loaded in the camera body 30 is ISO 100 is considered. In this case, the object distance measuring sensor 20 determines a "far object" because the real object distance is more than '2.4' meters, the object brightness measuring sensor 22 determines a "bright object" because the real object brightness is more than EV 10, and the film sensitivity detecting sensor 24 determines a "low sensitive film" because the real film sensitivity is less than ISO 320.

Accordingly, the first switch circuit SW1 is turned OFF because the sensor 20 indicates a "far object", the second switch circuit SW2 is turned ON because the sensors 20 and 24 indicate a "far object and low sensitive film", and the third switch circuit SW3 is turned OFF because the sensors 20 and 22 indicate a "far and bright object". As a result, the first to third switch circuits are turned OFF, ON and OFF, respectively. Consequently, all of the first to third switch sections are turned off thereby de-energizing the electromagnet 74 just before the lock pawl 72b of the lock lever 72 is opposite to the second tooth 60b of the engaging teeth portion 60.

Once the latching of the control plate 18 by the latch lever 64 is released by the descent of the release lever 68 according to the depression of the shutter release button (not shown), the control plate 18 starts to move leftward in the drawings by the urging force of the spring 58. Just before the second tooth 60b of the engaging teeth portion 60 opposes the lock pawl 72b of the lock lever 72, the electromagnet 74 is de-energized, thereby rotating the lock lever 72 in the counterclockwise direction by the urging force of the spring 76 and setting the lock pawl 72b of the lock lever 72 be engaged with the second tooth 60b of the engaging teeth portion 60, and the movement of the control plate 18 is stopped. In this stopped condition, the cam follower 12b contacts the first cam surface portion 34a of the lens driving cam surface 34 while the cam follower 48 stops at a position in the first cam groove portion 52a of the diaphragm driving cam groove 52 which corresponds to 'f-8' of the diaphragm mechanism 16.

As a result, the lens 14 is stayed in the position which is suitable for focusing an object at a distance of '3' meters or more corresponding to "far object", the diaphragm sectors 36a and 36b of the diaphragm mechanism 16 are rotated to the position which defines the size of the aperture to 'f-8' corresponding to "intermediate condition", and the strobe control circuit 92 inhibits the flash of the strobe 92. Thereafter, the exposure to the film is executed by the shutter mechanism (not shown).

Thirdly, a case wherein the real object distance is 5 meters, the real object brightness is EV 7, and the real film sensitivity of the film loaded in the camera body 30 is ISO 100 is considered. In this case, the object distance measuring sensor 20 determines a "far object" because the real object distance is more than '2.4' meters, the object brightness measuring sensor 22 determines a "dark object" because the real object brightness is less than EV 10, and the film sensitivity detecting sensor 24 determines a "low sensitive film" because the real film sensitivity is less than ISO 320.

Accordingly, the first switch circuit SW1 is turned off because the sensor 20 indicates a "far object", the second switch circuit SW2 does not indicate, and the third switch circuit SW3 is turned ON because the sensors 20 and 22 indicate a "far and dark object". As a result, the first to third switch circuits are turned OFF,—(i.e., information not utilized) and off, respectively. Consequently, all of the first to third switch sections are turned OFF thereby de-energizing the electromagnet 74 just before the lock pawl 72b of the lock lever 72 is opposite the third tooth 60c of the engaging teeth portion 60.

Once the latching of the control plate 18 by the latch lever 64 is released by the descent of the release lever 68 according to the depression of the shutter release button (not shown), the control plate 18 starts to move leftward in the drawings by the urging force of the spring 58. Just before the third tooth 60c of the engaging teeth portion 60 opposes the lock pawl 72b of the lock lever 72, the electromagnet 74 is de-energized, thereby rotating the lock lever 72 in the counterclockwise direction by the urging force of the spring 76 and setting the lock pawl 72b of the lock lever 72 to be engaged with the third tooth 60c of the engaging teeth portion 60 and the movement of the control plate 18 is stopped. In this stopped condition, the cam follower 12b contacts the first cam surface portion 34a of the lens driving cam surface 34 while the cam follower 48 stops at a position in the first cam groove portion 52a of the diaphragm driving cam groove 52 which corresponds to 'f-4' of the diaphragm mechanism 16.

As a result, the lens 14 remains in the position which is suitable for focusing an object at a distance of '3' meters or more corresponding to a "far object", the diaphragm sectors 36a and 36b of the diaphragm mechanism 16 are rotated to the position which defines the size of the aperture to 'f-4' corresponding to a "dark condition", and the strobe control circuit 92 allow the flash of the strobe 92. Thereafter, the exposure of the film is executed by the shutter mechanism (not shown).

Fourthly, a case wherein the real object distance is '2' meters, the real object brightness is EV 7, and the real film sensitivity of the film loaded in the camera body 30 is ISO 100 is considered. In this case, the object distance measuring sensor 20 determines a "near object" because the real object distance is less than '2.4' meters, the object brightness measuring sensor 22 determines a "dark object" because the real object brightness is less than EV 10, and the film sensitivity detecting sensor 24 determines a "low sensitive film" because the real film sensitivity is less than ISO 320.

Accordingly, the first switch circuit SW1 is turned ON because the sensor 20 indicates a "near object", the second switch circuit SW2 does not indicate, and the third switch circuit SW3 is turned OFF because the sensors 20 and 22 indicate a "near and dark object". As a result, the first to third switch circuits are turned ON,—(i.e., information not utilized) and OFF, respectively. Consequently, all of the first to third switch sections are turned OFF thereby de-energizing the electromagnet 74 just before the lock pawl 72b of the lock lever 72 is opposite the fourth tooth 60d of the engaging teeth portion 60.

Once the latching of the control plate 18 by the latch lever 64 is released by the descent of the release lever 68 according to the depression of the shutter release button (not shown), the control plate 18 starts to move leftward in the drawings by the urging force of the spring 58. As shown in FIG. 3, just before the fourth tooth 60d of the engaging teeth portion 60 opposes the lock pawl 72b of the lock lever 72, the electromagnet 74 is de-energized, thereby rotating the lock lever 72 in the counterclockwise direction by the urging force of the spring 76 and setting the lock pawl 72b of the lock lever 72 be engaged with the fourth tooth 60d of the engaging teeth portion 60 and the movement of the control plate 18 is stopped. In this stopped condition, the cam follower 12b contacts the second cam surface portion 34b of the lens driving cam surface 34 while the cam follower 48 stops at a position in the second cam groove portion 52b of the diaphragm driving cam groove 52 which corresponds to 'f-4' of the diaphragm mechanism 16.

As a result, the lens 14 is moved to the position which is suitable for focusing an object at a distance of '2' meters or less corresponding to a "near object", the diaphragm sectors 36a and 36b of the diaphragm mechanism 16 are rotated to the position which defines the size of the aperture to 'f-4' corresponding to a "dark condition", and the strobe control circuit 92 allow the flash of the strobe 92. Thereafter, the exposure to the film is executed by the shutter mechanism (not shown).

Fifthly, a case wherein the real object distance is '2' meters, the real object brightness is EV 14, and the real film sensitivity of the film loaded in the camera body 30 is ISO 100 is considered. In this case, the object distance measuring sensor 20 determines a "near object" because the real object distance is less than '2.4' meters, the object brightness measuring sensor 22 determines a "bright object" because the real object brightness is more than EV 10, and the film sensitivity detecting sensor 24 determines a "low sensitive film" because the real film sensitivity is less than ISO 320.

Accordingly, the first switch circuit SW1 is turned ON because the sensor 20 indicates a "near object", the second switch circuit SW2 is turned OFF because the sensors 20 and 24 indicate a "near object and low sensitive film", and the third switch circuit SW3 is turned ON because the sensors 20 and 22 indicate a "near and bright object". As a result, the first to third switch circuits are turned ON, OFF and ON, respectively. Consequently, all of the first to third switch sections are turned OFF thereby de-energizing the electromagnet 74 just before the lock pawl 72b of the lock lever 72 is opposite the fifth tooth 60e of the engaging teeth portion 60.

Once the latching of the control plate 18 by the latch lever 64 is released by the descent of the release lever 68 according to the depression of the shutter release button (not shown), the control plate 18 starts to move leftward in the drawings by the urging force of the spring 58. Just before the fifth tooth 60e of the engaging teeth portion 60 opposes the lock pawl 72b of the lock lever 72, the electromagnet 74 is de-energized, thereby rotating the lock lever 72 in the counterclockwise direction by the urging force of the spring 76 and setting the lock pawl 72b of the lock lever 72 be engaged with the fifth tooth 60e of the engaging teeth portion 60 and the movement of the control plate 18 is stopped. In this stopped condition, the cam follower 12b contacts the second cam surface portion 34b of the lens driving cam surface 34 while the cam follower 48 stops at a position in the second cam groove portion 52b of the diaphragm driving cam groove 52 which corresponds to 'f-8' of the diaphragm mechanism 16.

As a result, the lens 14 is moved to the position which is suitable for focusing on an object at a distance of '2' meters or less corresponding to a "near object", the diaphragm sectors 36a and 36b of the diaphragm mechanism 16 are rotated to the position which defines the size of the aperture to 'f-8' corresponding to an "intermediate condition", and the strobe control circuit 92 inhibits the flash of the strobe 92. Thereafter, the exposure to the film is executed by the shutter mechanism (not shown).

Finally and sixthly, a case wherein the real object distance is '2' meters, the real object brightness is EV 14, and the real film sensitivity of the film loaded in the camera body 30 is ISO 400 is considered. In this case, the object distance measuring sensor 20 determines a "near object" because the real object distance is less than '2.4' meters, the object brightness measuring sensor 22 determines a "bright object" because the real object brightness is more than EV 10, and the film sensitivity detecting sensor 24 determines a "high sensitive film" because the real film sensitivity is equal to ISO 400.

Accordingly, the first switch circuit SW1 is turned ON because the sensor 20 indicates a "near object", the second switch circuit SW2 is turned ON because the sensors 20 and 24 indicate a "near object and high sensitive film", and the third switch circuit SW3 is turned ON because the sensors 20 and 22 indicate a "near and bright object". As a result, all of the first to third switch circuits are turned ON. Consequently, all of the first to third switch sections are turned OFF thereby de-energizing the electromagnet 74 just before the lock pawl 72b of the lock lever 72 is opposite the sixth tooth 60f of the engaging teeth portion 60.

Once the latching of the control plate 18 by the latch lever 64 is released by the descent of the release lever 68 according to the depression of the shutter release button (not shown), the control plate 18 starts to move leftward in the drawings by the urging force of the spring 58. Just before the sixth tooth 60f of the engaging teeth portion 60 opposes the lock pawl 72b of the lock lever 72, the electromagnet 74 is de-energized, thereby rotating the lock lever 72 in the counterclockwise direction by the urging force of the spring 76 and setting the lock pawl 72b of the lock lever 72 be engaged with the sixth tooth 60f of the engaging teeth portion 60 and the movement of the control plate 18 is stopped. In this stopped condition, the cam follower 12b contacts the second cam surface portion 34b of the lens driving cam surface 34 while the cam follower 48 stops at a position in the second cam groove portion 52b of the diaphragm driving cam groove 52 which corresponds to 'f-16' of the diaphragm mechanism 16.

As a result, the lens 14 is moved to the position which is suitable for focusing an object at a distance of '2' meters or less corresponding to a "near object", the diaphragm sectors 36a and 36b of the diaphragm mechanism 16 are rotated to the position which defines the size of the aperture to 'f-16' corresponding to a "bright condition", and the strobe control circuit 92 inhibits the flash of the strobe 92. Thereafter, the exposure to the film is executed by the shutter mechanism (not shown).

As mentioned above in detail, in the camera 10 of the first embodiment, it is possible that the lens 14 is moved to a position along Its optical axis 0 that depends on the object distance (that is, auto-focus can be accomplished) and the aperture of the diaphragm mechanism 16 is set to an f-number that depends on the brightness of the object and the sensitivity of the film (that is, auto-exposure can be accomplished) by moving only the control plate 18 in response to the shutter release operation, and stopping it at a predetermined position corresponding to the detected photographing control conditions. In other words, in the camera 10 of the first embodiment, it is possible that the distance between the lens 14 and the film according to the object distance, and the f-number of the aperture of the diaphragm mechanism 16 according to the brightness of the object, and the sensitivity of the film as the photographing control condition are defined by moving only the control plate 18 in response to the shutter release operation, and stopping it at a predetermined position corresponding to the detected or present photographing control condition.

The strobe control circuit 94 does not utilize the information from the film sensitivity detecting sensor 24 for controlling the flash of the strobe 92, but automatically allows the flash of the strobe 92 when the object brightness detected by the object brightness measuring sensor 22 is less than EV 10 or the aperture is set to 'f-4' corresponding to the "dark condition" in the first embodiment. However, it is possible to flash the strobe 92 by considering the film sensitivity. More specifically, it is possible to allow the strobe 92 to flash not only in the case of 'f-4' or "dark condition" but also in the case of 'f-8' or the "intermediate condition" If the "low sensitive film" is detected, or it is possible to inhibit the strobe 92 from flashing in the case of 'f-4' or the "dark condition" if the "high sensitive film" is detected.

Hereinafter, a second embodiment of a camera according to the present invention will now be described in detail with reference to the accompanying drawings of FIGS. 5 and 6.

FIG. 5 shows a construction of a camera 10' of the second embodiment according to the present invention. The camera 10'of the second embodiment can adjust both the distance between the lens 14 and the film according to the object distance and the f-number of the aperture of the diaphragm mechanism 16 as the photographing control conditions are defined to be depending on the brightness of the object and the sensitivity of the film by moving only the control plate 18 in response to the shutter release operation and stopping it at a predetermined position corresponding to the detected photographing control conditions, the same as in the first embodiment.

However in the second embodiment, the distance between the lens 14 and the film is adjustably set to a "far object" (that is, a long object distance), a "medium object" (that is, an intermediate object distance) or a "near object" (that is, a short object distance) by moving only the lens 14 along an optical axis 0, while the aperture of the diaphragm mechanism 16 is adjustably set to a "dark condition", "intermediate condition" or "bright condition" as in the first embodiment. These adjustments are executed by a control circuit 108 as control means as shown in FIG. 6, based on detected information from the object distance measuring sensor 20', the object brightness measuring sensor 22, and the film sensitivity detecting sensor 24. The control procedure of the control circuit 108 will be described in detail. In the following description, the same or similar reference numerals as in the first embodiment are applied to the same or similar members and the descriptions thereof will be omitted.

The control plate 18 is provided with a lens driving cam surface 100 as the first cam means which is formed on the upper edge portion thereof and the diaphragm driving cam groove 102 as the second cam means disposed below the guide groove 54. The control plate 18 is further provided with an engaging teeth portion 104 formed on the under edge portion thereof for stopping the movement of the control plate 18 and a code member 106 disposed below the diaphragm driving groove 102 for detecting the position of the control plate 18.

The lens driving cam surface 100 includes a first cam surface portion 100a on the left third of the upper edge portion of the control plate 18, a second cam surface portion 100b on the middle third thereof and a third cam surface portion 100c on the right third thereof, in the drawings. The first cam surface is defined by an upper surface of the upper edge portion of the control plate 18. The second cam surface portion 100b protrudes from the first cam surface portion 100a (that is, set to be nearer to the lens 14 than the first cam surface portion 100a). The third cam surface portion 100c protrudes from the second cam surface portion 100b (that is, set to be nearer to the lens 14 than the second cam surface portion 100b). The first and second cam surface portions 100a and 100b are smoothly coupled through a first coupling surface portion 100d, while the second and third cam surface portions 100b and 100c are smoothly coupled through a second coupling surface portion 100e.

The cam follower 12b attached to the arm 12a which is extended from the lens barrel 12 contacts the lens driving cam surface 100. As a result, when the control plate 18 moves, the lens barrel 12 is moved along the optical axis 0 of the lens 14 (that is, vertically in the drawings) according to the positions where the cam follower 12b contacts the cam surface 100. Consequently, the position of the lens 14 along the optical axis 0 is adjustably changed (or alternatively selected) among a position suitable for photographing an object at a distance of '5' meters corresponding to the "far object", a position suitable for photographing an object at a distance of '2.7' meters corresponding to the "medium object" and a position suitable for photographing an object at a distance of '1.4' meters corresponding to the "near object".

The diaphragm driving cam groove 102 includes a first driving cam groove portion 102a on the left third thereof which is slanted upward from the left end portion thereof to the right side thereof by a predetermined gradient as in the first embodiment, a second driving cam groove portion 102b on the middle third thereof which is slanted upward from the left end portion thereof to the right side thereof by the same predetermined gradient as in the first driving cam groove portion 102a and a third driving cam groove portion 102c on the right third thereof which is slanted upward from the left end portion thereof to the right side thereof by the same predetermined gradient as in the first driving cam groove portion 102a. The first and second driving cam groove portions 102a and 102b are coupled through a first coupling groove portion 102d with a sudden turn, while the second and third driving cam groove portions 102b and 102c are coupled through a second coupling groove portion 102e with a sudden turn.

The cam follower 48 attached to the diaphragm drive arm 38 is slidably fitted into the diaphragm driving cam groove 102. As a result, when the control plate 18 moves, the diaphragm drive arm 38 is driven to be swung according to how the cam follower 48 moves along the first, second or third cam groove portion 102a, 102b or 102c. Consequently, the pair of diaphragm sectors 36a and 36b are swung about the support shaft 40 according to the swinging of the diaphragm drive arm 38, thereby setting the aperture of the diaphragm mechanism 16 to the given value.

More specifically, the f-number of the aperture defined by the diaphragm mechanism 16 is changed to 'f-16' corresponding to a "bright condition", 'f-8' corresponding to an "intermediate condition", and 'f-4' (that is, the fully opened aperture in the second embodiment) corresponding to a "dark condition", in order mentioned, while the cam follower 48 is slidably moved along each of the first to third cam groove portion 102a to 102c from the left end portion thereof to the right side in the drawings. On the other hand, the f-number of the aperture defined by the diaphragm mechanism 16 is suddenly changed from 'f-4' to 'f-16' when the cam follower 48 is slidably moved from the right end of the first cam groove portion 102a to the left end of the second cam groove portion 102b, or from the right end of the second cam groove portion 102b to the left end of the third cam groove portion 102c in the drawings.

The position where the gradient of the diaphragm driving cam groove 102 changes corresponds to the first coupling cam groove portion 102d or second coupling cam groove portion 102e of the lens driving cam surface 102. Accordingly, in the second embodiment, the f-number of the aperture can be set on 'f-4', 'f-8', and 'f-16' while the position of the lens 14 along the optical axis 0 relative to the film can be set to focus an object at a distance of '5' meters corresponding to a "far object", at a distance of '2.7' meters corresponding to a "medium object" and at a distance of '1.4' meters corresponding to a "near object". Any combination of the '3' aperture values and '3' focusing distances can be selected.

The engaging teeth portion 104 is constructed with nine teeth 104a to 104i which are formed on the lower edge of the control plate 18 and arranged in the lateral direction in the drawings (that is, in the moving direction of the control plate 18). Once the electromagnet 74 is energized, the lock lever 72 is attracted by the magnetic force produced in the electromagnet 74 in the clockwise direction in the drawings, thereby rotating the lock lever 72 so that the lock pawl 72b is disengaged from the engaging teeth portion 104 against the urging force of the spring 74. On the other hand, once the electromagnet 74 is de-energized, the lock lever 72 is rotated in the counterclockwise direction in the drawings by the urging force of the spring 74 so that the pawl portion 72b is engaged with the engaging teeth portion 104. As a result, when the electromagnet 74 is de-energized, the lock pawl 72b of the lock lever 72 will be engaged with one of nine teeth 104a to 104i of the engaging teeth portion 104 formed on the control plate 18, thereby stopping the movement of the control plate 18.

According to the stop position of the control prate 18, a combination of the position of the lens 14 relative to the film and the f-number of the aperture defined by the diaphragm mechanism 16 is defined as mentioned above. The relationship among the stop position of the control plate 18 according to the engaged one of the nine teeth 104a to 104i, the position of the lens 14 relative to the film, and the f-number of the aperture is defined in Table 5 as follows.

TABLE 5

|  | positional setting of lens 14 | f-number |
| --- | --- | --- |
| tooth 104a | 5.0 meters | 16 |
| tooth 104b | 5.0 meters | 8 |
| tooth 104c | 5.0 meters | 4 |
| tooth 104d | 2.7 meters | 16 |
| tooth 104e | 2.7 meters | 8 |
| tooth 104f | 2.7 meters | 4 |
| tooth 104g | 1.4 meters | 16 |
| tooth 104h | 1.4 meters | 8 |
| tooth 104i | 1.4 meters | 4 |

Thus, the relationship indicated in Table 5 shows that the control plate 18 can be stopped at one of 9 positions corresponding to the combination of distance of the object from the lens 16 and aperture value.

The stop control of the control plate 18 (that is, the de-energization control of the electromagnet 74) is executed by the control circuit 108 and four sliding switches 120, 122, 124 and 126 which constitute position detection means for detecting the present position of the control plate 18, as shown in FIG. 6. More specifically, a code member 106 corresponding to the code member 62 of the first embodiment is attached to the control plate 18 to represent the present position of the control plate 18. The code member 106 is constructed by four rows of switch plates 110, 112, 114 and 116 each of which has electrically conductive portions 106a and electrically insulating portions 106b in a different pattern from each other as being similar to the first embodiment. The four rows of switch plates 110, 112,114 and 116 are disposed below the diaphragm driving cam groove 102 and extend parallel to the moving direction of the control plate 18 (or, the lateral direction in the drawings).

The four sliding switches 120, 122, 124 and 126 slidingly contact the four rows of the switch plates 110, 112, 114 and 116 of the code member 106, respectively. The sliding switches 120, 122, 124 and 126 are fixed to the camera body 30 and arranged vertically and in parallel to each other. Each of the sliding switches 120, 122, 124 and 126 has a pair of contact terminals which are capable of contacting the corresponding switch plate 110, 112, 114 or 116. When the pair of contact terminals of each of the sliding switch 120, 122, 124 or 126 contact the electrically conductive portion 106a of the corresponding switch plate 110, 112, 114 and 116, the electrical continuity between the pair of contact terminals is established (that is, the sliding switch 120, 122, 124 or 126 is turned on). There the pair of contact terminals of each of the sliding switch 120, 122, 124 and 126 contact the electrically insulating portion 106b of the corresponding switch plate 110, 112, 114 and 116, the electrical continuity between the pair of contact terminals is not established (that is, the sliding switch 120, 122, 124 or 126 is turned off).

Thus, each of sliding switches 120, 122, 124 and 126 is turned on and/or off according to the stop position of the control plate 18. The code member 106 is formed so that four sliding switches 120, 122, 124 and 126 are turned on/off in the different pattern from each other as shown in Table 6 as follows.

TABLE 6

|  | sliding switch 120 | sliding switch 122 | sliding switch 124 | sliding switch 126 |
| --- | --- | --- | --- | --- |
| tooth 104a | ON | ON | ON | ON |
| tooth 104b | ON | ON | OFF | ON |
| tooth 104c | ON | ON | OFF | OFF |
| tooth 104d | ON | OFF | ON | ON |
| tooth 104e | ON | OFF | OFF | ON |
| tooth 104f | ON | OFF | OFF | OFF |
| tooth 104g | OFF | OFF | ON | ON |
| tooth 104h | OFF | OFF | OFF | ON |
| tooth 104i | OFF | OFF | OFF | OFF |

Accordingly, it is possible to determine the present position of the control plate 18 by detecting the on/off state of each of the sliding switches 120, 122, 124 and 126.

FIG. 6 is a block diagram schematically showing a circuit construction of the control circuit 108 of the first embodiment. The control circuit 108 is constructed so as to be able to energize or de-energize the electromagnet 74 in order to stop the control plate 18 at a predetermined position. The control circuit 108 includes the strobe control circuit 94 for controlling the flash of the strobe 92 which is equipped to the camera body 30 as in the first embodiment, and first to fourth switch circuits SW11 to SW14 to be described later in detail. An object distance measuring sensor 20' similar to the object distance measuring sensor 20 in the first embodiment, the object brightness measuring sensor 22 the same as in the first embodiment, and the film sensitivity detecting sensor 24 as in the first embodiment as well as the first to fourth sliding switches 120, 122, 124 and 126 are connected to the control circuit 108.

The object distance measuring sensor 20' is a known active-type AF sensor and detects the object distance, and determines a "near object" when the object distance is less than '1.9' meters, a "medium object" when the object distance is equal to or more than '1.9' meters and less than '3.5' meters, or a "far object" when the object distance is equal to or more than '3.5' meters. The sensor 20' is connected to the first and second switch circuits SW11 and SW12 and sends the determined object distance thereto. The object brightness measuring sensor 22 detects the brightness of the object and determines a "dark object" when the object brightness is less than EV 10 or a "bright object" when the object brightness is equal to or more than EV 10 as in the first embodiment. The sensor 22 is connected to the fourth switch circuit SW14 and the strobe control circuit 94 and sends the determined object brightness thereto. The film sensitivity detecting sensor 24 detects the sensitivity or speed of the film loaded in the camera body 30 and determines a "low sensitive film" when the film sensitivity is equal to or less than ISO 320 and a "high sensitive film" when the film sensitivity is equal to or more than ISO 400 as in the first embodiment. The sensor 24 is connected to the third switch circuit SW13 and sends the determined film sensitivity thereto.

First to fourth switch sections to be described later in detail are used to provide a simple logic function that controls the energization of the electromagnet 74 based on the output of the sensors 20', 22 and 24 and the sliding switches 120, 122, 124 and 126. The object distance measuring sensor 20' has three output states, one represents a "near object", another one represents a "medium object" and remaining one represents a "far object". Similarly, the object brightness measuring sensor 22 has two output states, one represents a "bright object" while the other represents a "dark object" as in the first embodiment. Further, the film sensitivity detecting sensor 24 also has two output states, one represents a "high film speed" greater than ISO 400 while the other represents a "low film speed" less than ISO 320 as in the first embodiment.

The first switch section consists of first switch circuit SW11 in series with the first sliding switch 120. The first switch SW11 is set to be turned off if the sensor 20' outputs a "far or medium object", while be turned on if the sensor 20' outputs a "near object". Thus, the first switch section is turned off if one or both of the first switch circuit SW11 or the first sliding switch 120 are turned off. Similarly the second switch section consists of the second switch circuit SW12 in series with the second sliding switch 122. The second switch circuit SW12 is set to be turned off if the sensor 20' outputs a "far object", while be turned on if the sensor 20' outputs a "medium or near object". Thus, the second switch section is turned off if one or both of the second switch circuit SW12 or the second sliding switch 122 are turned off.

The third switch section consists of the third switch circuit SW13 in series with the third sliding switch 124. The third switch circuit SW13 is set to be turned off if the sensor 24 outputs a "high sensitive film", while be turned on if the sensor 24 outputs a "low sensitive film". Thus, the third switch section is turned off if one or both of the third switch circuit SW13 or the third sliding switch 124 are turned off. Further, the fourth switch section consists of the fourth switch circuit SW14 in series with the fourth sliding switch 126. The fourth switch circuit SW14 is set to be turned off if the sensor 22 outputs a "bright object", while be turned on if the sensor 22 outputs a "dark object". Thus, the fourth switch section is turned off if one or both of the fourth switch SW14 or the fourth sliding switch 126 are turned off.

The four switch sections are connected in parallel across the battery (BAT) and electromagnet 74, which are connected in series. Thus the connection between the battery (BAT) and the electromagnet 74 is interrupted only if all four switch sections are turned off. Thus, if at least one switch section is turned on, the electromagnet will remain energized.

The strobe 92 is flashed under the control of the strobe control circuit 94 when the shutter mechanism is actuated to accomplish the exposure. More specifically, the strobe control circuit 94 causes the strobe 92 to flash when the sensor 22 outputs a "dark object", while it inhibits the strobe 92 from flashing when the sensor 22 outputs a "bright object".

When the code plate 106 is moved from the right to the left in accordance with the movement of the control plate 18, the switches 120, 122, 124 and 126 will change state. Table 7 shows the state of the switches for different positions of the lock pawl 72b with respect to the teeth 104a through 104i.

TABLE 7

| | 1st switch section | | 2nd switch section | | 3rd switch section | | 4th switch section | |
|---|---|---|---|---|---|---|---|---|
| | SW11 | 120 | SW12 | 122 | SW13 | 124 | SW14 | 126 |
| tooth 104a | OFF | ON | OFF | ON | OFF | ON | OFF | ON |
| tooth 104b | OFF | ON | OFF | ON | ON | OFF | OFF | ON |
| tooth 104c | OFF | ON | OFF | ON | — | OFF | ON | OFF |
| tooth 104d | OFF | ON | ON | OFF | OFF | ON | OFF | ON |
| tooth 104e | OFF | ON | ON | OFF | ON | OFF | OFF | ON |
| tooth 104f | OFF | ON | ON | OFF | — | OFF | ON | OFF |
| tooth 104g | ON | OFF | ON | OFF | OFF | ON | OFF | ON |
| tooth 104h | ON | OFF | ON | OFF | ON | OFF | OFF | ON |
| tooth 104i | ON | OFF | ON | OFF | — | OFF | ON | OFF |

Next the general operation of the camera 10' will be described.

At first, the control plate 18 is moved rightward as shown in the drawings, by the charge pin 78, during the wind operation of the film, and is latched in resting position (or mechanically charged position). In this position, when an operator depresses the shutter release button (not shown) by half a stroke, the sensors 20, 22 and 24 detect the object distance, ambient light and film sensitivity (or speed), respectively. Simultaneously, the electromagnet 74 is energized so that the lock lever 72 rotates in the clockwise direction against the urging force of the spring 76. This disengages the lock pawl 72b being separated from the engaging portion 60.

Then the switch circuits SW11, SW12, SW13 and SW14 are set based on the information output by the sensors 20, 22 and 24 as described above.

Further depression of the shutter release button (not shown) results in the release lever 68 being lowered, contacting the latch lever 64. The latch lever 64 is thus rotated about the supporting shaft 64b such that latch pawl 64a is disengaged from engaging pawl 18b. The control plate 18 is then moved to the left by the urging force of the spring 58.

The control plate 18 moves to the left until it is stopped by the engagement of the lock pawl 72b and one of the teeth 104a through 104i of the engaging teeth portion 60. Thus the electromagnet 74 must be de-energized in order that the above mentioned locking operation can occur.

As mentioned above, the electromagnet 74 is de-energized when all of the first through fourth switch sections are turned off. Therefore at least one of the switches of each of the switch sections must be turned off, if the electromagnet 74 is to be de-energized. The switch circuits SW11, SW12, SW13 and SW14 are set to have values that depend on the output of the sensors 20', 22 and 24 as described above. Each row of Table 7 represents a different combination of object distance, object brightness and film sensitive (or, speed) that can be output by the three sensors 20', 22 and 24. Thus as the control plate 18 moves, the sliding switches 120, 122, 124 and 124 will change state. When the control plate 18 is at a position that either the first sliding switch 120 or the first switch circuit SW11 is turned off and either the second sliding switch 122 or the second switch circuit SW12 is turned off and either the third sliding switch 124 or the third switch circuit SW13 is turned off and either the fourth sliding switch 126 or the fourth switch circuit SW14 is turned off, the electromagnet 74 will be de-energized, the lock lever 72 will rotate counter-clockwise and thus the locking pawl 72a will engage one of the teeth 104a through 104i, stopping the movement of the control plate 18.

The movement of the control plate 18 results in the cam followers 48 and 12b moving and thus the diaphragm size and distance of the lens 14 from the film plane will be changed.

Table 7 represents the relationship between the values of the first to fourth switch circuits SW11, SW12, SW13 and SW14 and the first to fourth sliding switches 120, 122, 124 and 126 in order to de-energize the electromagnet 74. The tooth number for each row is the tooth that the locking pawl 72b will engage when the electromagnet 74 is de-energized according to the setting of the first to fourth switch sections.

Table 8 shows the relationship between the teeth (and thus the position where the control plate 18 is locked after the release of the shutter) and the object distance, object brightness and film sensitivity.

TABLE 8

|  | detected object distance | detected film sensitivity | detected object brightness |
| --- | --- | --- | --- |
| tooth 104a | ≧3.5 (m) | ≧ISO 400 | ≧EV 10 |
| tooth 104b | ≧3.5 (m) | ≦ISO 320 | ≧EV 10 |
| tooth 104c | ≧3.5 (m) | — | <EV 10 |
| tooth 104d | <3.5 (m) ≧1.9 (m) | ≧ISO 400 | ≧EV 10 |
| tooth 104e | <3.5 (m) ≧1.9 (m) | ≦ISO 320 | ≧EV 10 |
| tooth 104f | <3.5 (m) ≧1.9 (m) | — | <EV 10 |
| tooth 104g | <1.9 (m) | ≧ISO 400 | ≧EV 10 |
| tooth 104h | <1.9 (m) | ≦ISO 320 | ≧EV 10 |
| tooth 104i | <1.9 (m) | — | <EV 10 |

As mentioned above in detail, in the camera 10' of the second embodiment, it is possible that the lens 14 is moved to a position along its optical axis 0 that depends on the object distance (that is, auto-focus can be accomplished) and the aperture of the diaphragm mechanism 16 is set to an f-number that depends on the brightness of the object and the sensitivity of the film (that is, auto-exposure can be accomplished) by moving only the control plate 18 in response to the shutter release operation, and stopping it at a predetermined position corresponding to the detected photographing control condition, as well as the first embodiment. In other words, in the camera 10' of the second embodiment, it is possible that both of the distance between the lens 14 and the film according to the object distance and the f-number of the aperture of the diaphragm mechanism 16 according to the brightness of the object and the sensitivity of the film as the photographing control condition are defined by moving only the control plate 18 in response to the shutter release operation, and stopping it at a predetermined position corresponding to the detected and present photographing control condition.

The strobe control circuit 94 does not utilize the information from the film sensitivity detecting sensor 24 for controlling the flash of the strobe 92, but automatically allows the flash of the strobe 92 when the object brightness detected by the object brightness measuring sensor 22 is less than EV 10 or the aperture is set to 'f-4' corresponding to the "dark condition" in the second embodiment. However, it is possible to flash the strobe 92 by considering the film sensitivity. More specifically, it is possible to allow the strobe 92 to flash not only in the case of 'f-4' or "dark condition" but also in the case of 'f-8' or the "intermediate condition" if the "low sensitive film" is detected, or it is possible to inhibit the strobe 92 from flashing in the case of 'f-4' or the "dark condition" if the "high sensitive film" is detected.

The present invention is not limited to the constructions described in the first and second embodiments as mentioned above in detail. For example, the control plate 18 is constructed as a plate member and set to be movable in one linear direction in the first and second embodiments, however, the present invention is not limited to such a construction and the control plate may be constructed as a cylindrical member and set to be rotatable about the central axis thereof. Also, the position of the lens 14 is selected from two positions corresponding to "far object" and "near object" in the first embodiment while the position of the lens 14 is selected from three positions corresponding to "far object", "medium object" and "near object" in the second embodiment, and the 'f-number' of the diaphragm mechanism 16 is selected from three values corresponding to "bright object", "intermediate object" and "dark object" in the first and second embodiments, however, the present invention is not limited to such focusing positions and 'f-numbers'. The position of the lens 14 may be selected from an arbitrary number of the positions and the 'f-number' may be selected from an arbitrary number of the 'f-number' value.

Furthermore, the position of the control plate 18 is detected from the contact position between the code member and one of the sliding switches in the first and second embodiments, however, the present invention is not limited to such a construction and the position of the control plate 18 may be detected by counting the number of pulses from an encoder which outputs the pulses according to the movement of the control plate 18.

Hereinafter, a third embodiment of a camera according to the present invention will now be described in detail with reference to the accompanying drawings of FIGS. 7 to 15.

FIG. 7 shows a construction of a camera 10" of the third embodiment according to the present invention. As shown in FIG. 7, the camera 10" of the third embodiment includes the photographing control means which is constructed by the photographing or focus lens 14 received in the lens barrel 12 and a diaphragm mechanism 16".

The camera 10" further includes a single control plate 200 as a single movable control member for adjustably setting both the distance between the lens 14 and the film (in other words, a position of the lens 14 relative to the film) according to the object distance between the object and the film, and the aperture (or aperture-stop) defined by both the diaphragm mechanism 16 according to the brightness of the object and a sensitivity of a film loaded in the camera 10", by rotating only the single control plate 200 in one direction.

In the third embodiment, the distance between the lens 14 and the film is adjustably set to a "far object" (that is, a long object distance) or a "near object" (that is, a short object distance) by moving the lens 14 along the optical axis 0, and the aperture of the diaphragm mechanism 16 is adjustably set to a "dark condition", "intermediate condition" or "bright condition", as in the first embodiment. These adjustments are executed by a control circuit 202 as control means as shown in FIG. 9, based on detected information from the object distance measuring sensor 20 and an object brightness measuring sensor 22" similar to the object brightness measuring sensor 22 in the first and second embodiments. The control procedure of the control circuit 202 will be described in detail.

As shown in FIG. 8, the camera 10" of the third embodiment is provided with a base plate 206 which is attached to a camera body (not shown) so that It is in a plane extending perpendicular to the optical axis 0 of the lens 14 and which has a rear photographing aperture 204, and a mounting plate 210 which is disposed above in the drawings and parallel to the base plate 206 (that is, on the side of the lens 14 along the optical axis 0) with a predetermined distance therebetween, and which has a front photographing aperture 208 that is coaxial with the rear photographing aperture 204 and has the same size as the rear photographing aperture 204. A rear space below the base plate 206 is defined as a film loading chamber into which a film cartridge containing a film therein is received. A shutter mechanism 212 is mounted on the front surface of the mounting plate 210 so that it can open the rear and front photographing aperture 204 and 208 with a predetermined shutter time (for example, 1/250 second in the third embodiment).

Disposed between the base plate 206 and the mounting plate 210 is a release lever 214 which is vertically movable in the drawings by a predetermined stroke and which is moved by a shutter release button (not shown). The release lever 214 is lowered upon the shutter release operation, as shown in the drawings. A pair of elongated guide grooves 216a and 216b are formed in the upper and lower portions of the release lever 214, respectively, so that these grooves 216a and 216b extend in the vertical direction. Fixed between the base plate 206 and the mounting plate 210 are pair of guide pins 218a and 218b which are arranged to be vertically separated from each other and slidably fitted into the elongated guide grooves 216a and 216b, respectively. Accordingly, the release lever 214 is supported so as to be movable in the vertical direction in the drawings with the guide pins 218a and 218b being fitted into the elongated guide grooves 216a and 216b, respectively. Thus the stroke of the movement of the release lever 214 is defined by a length which is a difference between the vertical length of each of the guide grooves 216a and 216b and the diameter of each of the guide pins 218a and 218b.

The release lever 214 has a recess 214a formed on the right side edge thereof in the drawings with which an engaging portion 200a which is formed to one end portion (left side portion in the drawings) of the control plate 200 engages, and a protrusion 214b formed on the left side edge thereof in the drawings to which the lower end of a spring 220 to be described later is coupled. The vertical length of the recess 214a is defined so that it allows the release lever 214 to move downwardly by a full stroke or to the lowest position thereof while the control plate 200 is locked in the position shown in FIG. 7. The upper end of the spring 220 is coupled to the engaging pin 222 which is fixed to the base plate 206. The release lever 214 is urged to move upward by the urging force of the spring 220 and is stopped in the uppermost or its resting position by resiliently contacting the lowest portion of each of the guide grooves 216a and 216b with the corresponding guide pins 218a and 218b.

The release lever 214 is lowered by the shutter release button (not shown) which is further depressed from a half-depressed position. When the shutter release button is depressed by the half-stroke, the object distance measuring sensor 20 and the object brightness measuring sensor 22 are actuated and start to detect the object distance and object brightness, respectively.

The control plate 200 is formed from a substantially fan-like-shaped plate member in the third embodiment. The control plate 200 is rotatably supported by a supporting shaft 224 which is rotatably supported between the base plate 206 and the mounting plate 208. A torsion spring 226 is wound around the supporting shaft 224. One end of the torsion spring 226 is coupled to the control plate 200 and the other end thereof is coupled to an engaging pin 206a which is fixed to the base plate 206. Consequently, the control plate 200 is urged to be rotated in the counterclockwise direction by the urging force of the torsion spring 226.

The engaging portion 200a of the control plate 200 resiliently contacts the lower surface of the recess 214a of the release lever 214, and accordingly, the rotational position of the control plate 200 is resiliently held in a position shown in FIG. 7. As a result, the control plate 200 is rotated in the counterclockwise direction if the control plate 200 is never stopped or locked in its rotational position.

The control plate 200 is provided with a lens driving cam surface 228 as the first cam means which is formed on the upper surface of the other end portion thereof as shown in FIG. 8 and which is arcuate around the support shaft 224. As shown in FIG. 7, the driving cam surface 228 includes a first cam surface portion 228a on the counterclockwise side in the drawings which is defined by the front surface of the control plate 200, and a second cam surface portion 228b on the clockwise side in the drawings. The second cam surface portion 228b protrudes from the first cam surface portion 228a (that is, set to be nearer to the lens 14 than the first cam surface portion 228a). The first and second cam surface portions 228a and 228b are smoothly coupled through a coupling surface portion 228c located at a substantially central portion of the other end portion of the control plate 200. The cam follower 12b attached to the arm 12a which extends from the lens barrel 12 contacts the lens driving cam surface 228.

As a result, when the control plate 200 rotates in the counterclockwise direction, the lens barrel 12 is moved along the optical axis 0 of the lens 14 (that is, vertically in FIG. 8) according to the positions where the cam follower 12b contacts the driving cam surface 228. Consequently, the position of the lens 14 along the optical axis 0 is adjustably changed (or alternatively selected) to a position suitable for photographing an object at a distance of '3' meters corresponding to a "far object" or a position suitable for photographing an object at a distance of '2' meters corresponding to a "near object".

The diaphragm mechanism 16" in the third embodiment includes a rotatable diaphragm disc 230 which is fixed to a support shaft 232 in the central portion thereof, while the diaphragm mechanism 16 in the first and second embodiments includes a pair of diaphragm sectors 36a and 36b. The support shaft 232 is rotatably supported between the base plate 204 and the mounting plate 208. A pinion gear 234 is also fixed to the support shaft 232 in a coaxial manner. Accordingly, the diaphragm disc 230 is rotated according to the rotation of the pinion gear 234.

The control plate 200 includes an opening 236 formed on the central portion thereof. The size of the opening 236 is set so as to not obstruct the photographing apertures 204 and 208 at all, even through the control plate 200 rotates about the support shaft 224. A rack 238 is formed in the right side edge in the drawings of the opening 236 to mesh with the pinion gear 234. The diaphragm disc 230 is rotated about the support shaft 232 upon rotation of the control plate 200. More specifically, when the control plate 200 is rotated by the maximum stroke or angle from its resting position, the diaphragm disc 230 which includes the pinion gear 232 meshing with the rack 238 is set to be rotated according to the rotation of the control plate 200 by '425' degrees (that is, one revolution ('360' degrees) of the diaphragm disc 230 plus '65' degrees).

As shown in FIG. 7, the central position of the diaphragm disc 230 is set to be in a position so that the diaphragm disc 230 covers the rear and front photographing apertures 204 and 208. Formed on the outer peripheral portion of the diaphragm disc 230 are first to fifth diaphragm apertures 230a to 230e which are arranged to aligned in the counterclockwise rotational direction of the diaphragm disc 230 in the order mentioned.

More specifically, the second diaphragm aperture 230b is angularly separated from the first diaphragm aperture 230a in the clockwise direction by '90' degrees, the third diaphragm aperture 230c is angularly separated from the second diaphragm aperture 230b in the clockwise direction by '65' degrees, the fourth diaphragm aperture 230d is angularly separated from the third diaphragm aperture 230c in the clockwise direction by '50' degrees, the fifth diaphragm aperture 230e is angularly separated from the fourth diaphragm aperture 230d in the clockwise direction by '65' degrees, and the first diaphragm aperture 230a is angularly separated from the fifth diaphragm aperture 230e in the clockwise direction by '90' degrees.

The first diaphragm aperture 230a defines 'f-4' (that is, the fully opened aperture in this embodiment) corresponding to the "dark condition" when the diaphragm disc 230 is rotated to a position where the first diaphragm aperture 230a is coaxially aligned with the photographing apertures 204 and 208. The second diaphragm aperture 230b defines 'f-8' corresponding to the "intermediate condition" when the diaphragm disc 230 is rotated to a position where the second diaphragm aperture 230b is coaxially aligned with the photographing apertures 204 and 208. The third diaphragm aperture 230c defines 'f-16' corresponding to the "bright condition" when the diaphragm disc 230 is rotated to a position where the third diaphragm aperture 230c is coaxially aligned with the photographing apertures 204 and 208. The fourth diaphragm aperture 230d defines 'f-16' corresponding to the "bright condition" when the diaphragm disc 230 is rotated to a position where the fourth diaphragm aperture 230d is coaxially aligned with the photographing apertures 204 and 208. The fifth diaphragm aperture 230e defines 'f-8' corresponding to the "intermediate condition" when the diaphragm disc 230 is rotated to a position where the fifth diaphragm aperture 230e is coaxially aligned with the photographing apertures 204 and 208.

The position where the coupling surface portion 228c of the lens driving cam surface 228 is formed is defined such that a portion between the third and fourth diaphragm apertures 230c and 230d is coaxially aligned with the photographing apertures 204 and 208 when the cam follower 12b contacts the coupling surface portion 228c.

Accordingly, the f-number of the aperture defined by the diaphragm mechanism 16 is changed to 'f-4' corresponding to the "dark condition", 'f-8' corresponding to the "intermediate condition", and 'f-16' corresponding to the "bright condition" in the order mentioned, whereby the diaphragm disc 230 is rotated in the counterclockwise direction, while the cam follower 12b slidably contacts the first cam surface 228a thereby defining the position of the lens 14 along the optical axis 0 relative to the film to the focusing range suitable for '3' meters or more of the object distance corresponding to the "far object". On the other hand, the f-number of the aperture defined by the diaphragm mechanism 16 is changed to 'f-16' corresponding to the "bright condition", 'f-8' corresponding to the "intermediate condition", and 'f-4' corresponding to the "dark condition" in order mentioned, whereby the diaphragm disc 230 is further rotated in the counterclockwise direction, while the cam follower 12b is slidably contacted with the second cam surface 228b thereby defining the position of the lens 14 along the optical axis 0 relative to the film to the focusing range suitable for '2' meters of the object distance corresponding to the "near object".

In other words, in the third embodiment, it is also possible to set an arbitrary combination of the position of the lens 14 relative to the film and the f-number of the aperture defined by the diaphragm mechanism 16, whereby the control plate 200 is rotated and stopped in the predetermined position accomplishing the arbitrary combination of the position of the lens 14 and the f-number of the aperture.

An engaging groove portion 240 is formed on the outer circumferential surface of the diaphragm disc 230 in the third embodiment. The engaging groove portion 240 is comprises by five grooves 240a to 240e which are formed on the outer circumferential surface of the control plate 200 and arranged in the circumferential and clockwise direction in the drawings (that is, opposite direction of the rotating direction of the control plate 200).

More specifically, the second groove 240b is angularly separated from the first groove 240a in the clockwise direction by '90' degrees, the third groove 240c is angularly separated from the second groove 240b in the clockwise direction by '65' degrees, the fourth groove 240d is angularly separated from the third groove 240c in the clockwise direction by '50' degrees, the fifth groove 240e is angularly separated from the fourth groove 240d in the clockwise direction by '65' degrees, and the first groove 240a is angularly separated from the fifth groove 240e in the clockwise direction by '90' degrees. The first to fifth diaphragm apertures 230a to 230e is set to be opposite the first to fifth grooves 240a to 240e in the radial direction of the diaphragm disc 230.

When the electromagnet 74 is de-energized in the rotating operation of the control plate 200, the lock lever 72 is rotated in the clockwise direction by the urging force of the spring 76, thereby engaging the lock pawl 72b of the lock lever 72 with anyone of the five grooves 240a to 240e of the engaging groove portion 240. As a result, the control plate 200 is stopped in a position which is defined by one of the five grooves 240a to 240e engaged by the lock pawl 72b. In the third embodiment, the control plate 200 and the diaphragm disc 230 are connected with each other through the intermeshing between the pinion gear 234 and rack 238, accordingly, the rotation of the control plate 200 is stopped when the rotation of the diaphragm disc 230 is stopped by the lock lever 72.

As shown in FIG. 7, the control plate 200 is held at a rotary position of maximum rotating angle in the clockwise direction according to the position of the release lever 214 in a non-release state of the camera 10" where the release lever 214 has not been depressed downward by the shutter release button (even though the operator has depressed the shutter release button by a half stroke). In the non-release state, the pinion gear 234 is set to be intermeshed with the rack 238 at the uppermost position thereof in the drawings and the fifth diaphragm aperture 230e is set to be coaxially aligned with the photographing apertures 204 and 208, as shown in FIG. 7. The lock lever 72 is arranged to face the lock pawl 72b thereof to the fifth groove 240e corresponding to the fifth diaphragm aperture 230e wherein the lock pawl 72b is capable of engaging with the fifth groove 240e in the non-release state.

In the third embodiment, the lock pawl 72b of the lock lever 72 is formed to have a width whereby the lock pawl 72b can engage with the any one of the first to fifth grooves 240a to 240e and contact the outer peripheral surface of the other end of the control plate 200. The outer peripheral surface of the other end of the control plate 200 is formed so that it is retracted from the outer circumferential surface of the diaphragm disc 230 without the upper end portion thereof in FIG. 7, at a position where the lock pawl 72b faces. The upper end portion of the outer peripheral surface of the other end of the control plate 200 has a protrusion 200b which is formed so that it is protruded from the outer circumferential surface of the diaphragm disc 230 to the lock pawl 72b at the position where the lock pawl 72b faces to the fifth groove 240e. Accordingly, as shown in FIG. 7, the lock pawl 72b is forced to be rotated in the counterclockwise direction so as to be separated from the outer circumferential surface of the diaphragm disc 230 against the urging force of the spring 76 by the protrusion 200b when the control plate 200 is positioned in the non-release state.

According to the stop position of the control plate 200, a combination of the position of the lens 14 relative to the film and the f-number of the aperture defined by the diaphragm mechanism 16 is defined as mentioned above. The relationship among the stop position of the control plate 200 according to the engaged one of the five grooves 240a to 240e, the position of the lens 14 relative to the film, and the f-number of the aperture is defined in Table 9 as follows.

TABLE 9

|  | positional setting of lens 14 | f-number |
| --- | --- | --- |
| groove 240a | 3 meters | 4 |
| groove 240b | 3 meters | 8 |
| groove 240c | 3 meters | 16 |
| groove 240d | 2 meters | 16 |
| groove 240e | 2 meters | 8 |
| groove 240a (after one revolution) | 2 meters | 4 |

By setting the relationship among the stop position of the control plate 200 and the diaphragm disc 230 according to the engaged one of the five grooves 240a to 240e by the lock pawl 72b, the position of the lens 14 relative to the film, and the f-number of the aperture as defined in Table 9, it is possible to stop the control plate 200 and the diaphragm disc 230 at a position where the distance between the lens 14 and the film (in other words, the position of the lens 14 relative to the film) is corresponding to the object distance between the object and the film detected by the object distance measuring sensor 20, and the aperture defined by the diaphragm mechanism 16 is corresponding to the brightness of the object detected by the object brightness measuring sensor 20, at photographing.

The stop control of the control plate 200 (that is, the de-energization control of the electromagnet 74) is executed by the control circuit 202 and a detecting mechanism 242 which constitutes position detection means for detecting the present position of the control plate 200. The detecting mechanism 242 is constructed from seven switches SW21 to SW27.

More specifically, a code member 244 is formed on the base plate 206 in the upper portion relative to the control plate 200 in the drawings. The code member 244 is constructed by a single arcuate continuous plate 246 extending along a circular line the center of which is defined by the support shaft 224 and seven independent plates 248a to 248g which are arranged in line along the circular line and disposed outside of the continuous plate 246 relative to the support shaft 224. First and second switch members 250 and 252 are fixedly attached to the upper edge of the control plate 200. The first switch member 250 is always contacted with the continuous plate 246 and the second switch member 252 is selectively contacted with one of the seven independent plates 248a to 248g upon rotation of the control plate 200 about the support shaft 224. The first and second switch members 250 and 252 are electrically connected with each other.

The seven switches SW21 to SW27 are constructed from the seven independent plates 248a to 248g, respectively, with the continuous plate 246 and the first and second switch members 250 and 252. For example, when the second switch member 252 is contacted with the first independent plate 248a, the first switch SW21 is only turned on and the remaining switches SW22 to SW27 are remained to be turned off. As shown in FIG. 9, all of the switches SW21 to SW27 are connected to the control circuit 202. The control circuit 202 discriminates the present position of the control plate 200 based on the ON state of the seven switches SW21 to SW27. The relationship among the seven switches SW21 to SW27, the grooves 232a to 232e, the position of the lens 14 relative to the film and f-number of the diaphragm mechanism 16 is defined so as to be shown in Table 10 as follows.

TABLE 10

| switch | groove | position of lens 14 | f-number of aperture |
| --- | --- | --- | --- |
| SW21 | 240e | (resting position) | |
| SW22 | 240a | 3 meters | 4 |
| SW23 | 240b | 3 meters | 8 |
| SW24 | 240c | 3 meters | 16 |
| SW25 | 240d | 2 meters | 16 |
| SW26 | 240e (just one revolution) | 2 meters | 8 |
| SW27 | 240a (after one revolution) | 2 meters | 4 |

The control circuit 202 determines that the control plate 200 is in its resting position (that is, release lever 214 is not pushed down by the shutter release button and remains in the non-release state) where the first switch SW21 is turned on. In the state where the first switch SW21 is turned on, the diaphragm disc 230 is in a position where the lock pawl 72*b* of the lock lever 72 faces to and is capable of engaging with the fifth groove 240*e* and the electromagnet 74 is de-energized. Though the lock pawl 72*b* is capable of engaging with the fifth groove 240*e* and the electromagnet 74 is de-energized where the control plate 200 is in its resting position as mentioned above, the lock pawl 72*b* is disengaged from the fifth groove 240*e* against the urging force of the spring 76 by the protrusion 200*b*. As a result, the diaphragm disc 230 (accordingly, the control plate 200) is set to be freely rotatable.

As shown in FIG. 9, the control circuit 202 is constructed so as to energize or de-energize the electromagnet 74 in order to stop the diaphragm disc 230 (accordingly, the control plate 200) at a predetermined rotational position. The control circuit 202 is connected to the strobe control circuit 94 for controlling the flash of the strobe 92, while the first to seventh switches SW21 to SW27 (which include the first and second switch members 250 and 252) as well as the object distance measuring sensor 20 and the object brightness measuring sensor 22" are connected to the control circuit 202, in order to accomplish the stop control.

The object distance measuring sensor 20 is a known active-type AF sensor which detects the object distance, and determines a "near object" when the object distance is less than '2.4' meters or a "far object" when the object distance is equal to or more than '2.4' meters. The sensor 20 sends the determined object distance to the control circuit 202. The object brightness measuring sensor 22" detects the brightness of the object and determines a "dark object" when the object brightness is less than EV 12, an "medium bright object" when the object brightness is equal to or more than EV 12 and less than EV 14 and a "bright object" when the object brightness is equal to or more than EV 14. The sensor 22" sends the determined object brightness to the control circuit 202.

The strobe 92 is flashed under the control of the strobe control circuit 94 when the shutter mechanism is actuated to accomplish the exposure. More specifically, the control circuit 202 causes the strobe control circuit 94 to flash the strobe 92 when the "dark object" is indicated in the determined object brightness from the object brightness measuring sensor 22", while it inhibits the strobe 92 from flashing when the "bright object" is indicated therein.

The control circuit 202 discriminates the photographing control conditions (that is, the position of the lens 14 relative to the film and the f-number of the diaphragm mechanism 16") based on the detected results from the object distance measuring sensor 20 and the object brightness measuring sensor 22" when the shutter release button (not shown) is depressed by a half stroke, and determines one groove from the grooves 232*a* to 232*e* which corresponds to the discriminated photographing control conditions. Then the control circuit 202 causes the electromagnet 74 to be de-energized by shutting off the supply of the electric power when one of the switch SW22 to SW27 corresponding to the discriminated photographing control conditions is turned on, thereby rotating the lock lever 72 in the clockwise direction by the urging force of the spring 74 to engage the lock pawl 72*b* with said one of grooves 240*a* to 240*e*, and stopping the rotation of the diaphragm disc 230 or the control plate 200.

Namely, the electromagnet 74 is de-energized to rotate the lock lever 72 thereby stopping the rotation of the diaphragm disc 230 or the control plate 200 at a time when a predetermined on of the switch SW21 to SW27 is turned off according to the discriminated photographing control conditions. Thus, the position where the control plate 200 is stopped becomes a position suitable for the present photographing control conditions.

Next, the generic operation of the camera 10" of the third embodiment will be described.

At first, in the non-release state, the release lever 214 is urged to move upward by the urging force of the spring 220 as shown in FIG. 7 and the control plate 200 is set in its resting position. When the shutter release button (not shown) is depressed by a half stroke from the resting position shown in FIG. 7, the sensors 20 and 22 start to detect and the electromagnet 74 is energized to rotate the lock lever 72 in the counterclockwise direction so that the lock pawl 72*b* is separated from the outer circumferential surface of the diaphragm disc 230, under the control of the control circuit 202. When the operator operates the shutter release button to be further depressed from the half depressed position, the release lever 214 is lowered in response to the depression of the shutter release button. Accordingly the control plate 200 starts to rotate about the support shaft 224 in the counterclockwise direction by the urging force of the spring 220.

The control circuit 202 causes the electromagnet 74 to be de-energized just before the control plate 200 is moved to a position where the photographing control conditions (that is, the distance between the lens 14 and the film, and the f-number of the diaphragm mechanism 16") are defined in accordance with the detected object distance and the detected object brightness. According to the de-energization of the electromagnet 74, the lock pawl 72*b* of the lock lever 72 becomes engaged with one of five grooves 240*a* to 240*e* and stops the rotation of the diaphragm disc 230 and the control plate 200.

The position of the lens barrel 12 (that is, the distance between the lens 14 and the film) and the aperture (or f-number) of the diaphragm mechanism 16" defined at the stopped position of the control plate 200 are determined as shown in the Table 10.

Thereafter, when the operator operates the shutter release button to be depressed by a full stroke, the shutter mechanism 212 is actuated and the exposure of the film is executed. The photographing control conditions corresponding to the grooves 240*a* to 240*e* each of which defines the stop position of the control plate 200 are shown in Table 11 as follows.

TABLE 11

| switch | groove | detected object distance | detected object brightness |
|---|---|---|---|
| SW22 | 240a | ≧2.4 (m) | <EV 12 |
| SW23 | 240b | ≧2.4 (m) | ≧EV 12 <EV 14 |
| SW24 | 240c | ≧2.4 (m) | ≧EV 14 |
| SW25 | 240d | <2.4 (m) | ≧EV 14 |
| SW26 | 240e (just one revolution) | <2.4 (m) | ≧EV 12 <EV 14 |
| SW27 | 240a (after one revolution) | <2.4 (m) | <EV 12 |

Namely, the photographing control conditions wherein the detected object distance is less than '2.4' meters and the detected object brightness is less than EV '12' is defined whereby the release lever 214 is depressed by a full stroke and the diaphragm disc 230 is rotated more than one revolution (that is, more than degrees).

Hereinafter, the specific operation of the camera 10" of the third embodiment will be described.

At first, the control circuit 202 causes the electromagnet 74 to be energized thereby attracting the lock lever 72 to separate the lock pawl 72b from the outer circumferential surface of the diaphragm disc 230 when the release lever 214 is depressed by a half stroke. Accordingly, the control plate 200 starts to rotate about the support shaft 224 in the counterclockwise direction upon the half depression of the release lever 214. Consequently, even though the protrusion 200b of the control plate 200 is disengaged from the lock pawl 72b of the lock lever 72, the diaphragm disc 230 is free from the engagement with the lock pawl 72b and can rotate in the counterclockwise direction.

Now, a case wherein the real object distance is '5' meters and the real object brightness is 'EV 10' is considered. In this case, the object distance measuring sensor 20 determines a "far object" because the real object distance is more than '2.4' meters and the object brightness measuring sensor 22" determines a "dark object" because the real object brightness is less than 'EV 12'.

Accordingly, the control circuit 202 causes the electromagnet 74 to be de-energized when the second switch plate 252 has been removed from the first independent plate 248a and becomes to contact the second switch plate 248b so that the second switch SW21 becomes to be turned on, upon rotation of the control plate 200. As a result, the lock pawl 72b of the lock ever 72 is rotated and becomes to urgingly contact the outer circumferential surface of the diaphragm disc 230 by the urging force of the spring 76. In other words, the lock pawl 72b is set to be capable of engaging the first groove 240a.

When the diaphragm disc 230 is further rotated upon rotation of the control plate 200 by '90' degrees from its resting position so that the first groove 240a comes to face to the lock pawl 72b, then the lock pawl 72b comes to be engaged with the first groove 240a as shown in FIG. 10. Consequently, the rotation of the diaphragm disc 230 and the control plate 200 is stopped. In this stopped condition, the cam follower 12b contacts the first cam surface portion 228a of the lens driving cam surface 228 and the first diaphragm aperture 230a corresponding to 'f-4' is coaxially aligned with the photographing apertures 204 and 208.

As a result, the lens 14 is stayed in the position which is suitable for photographing an object at a distance of '3' meters corresponding to a "far object", the diaphragm disc 230 is rotated to the position which defines the size of the aperture to 'f-4' corresponding to the "dark condition", and the strobe control circuit 94 allows the strobe 92 to flash. Thereafter, the exposure of the film is executed by the shutter mechanism 212 when the release lever 214 is fully depressed.

Secondly, a case wherein the real object distance is '5' meters and the real object brightness is 'EV 13' is considered. In this case, the object distance measuring sensor 20 determines a "far object" because the real object distance is more than '2.4' meters and the object brightness measuring sensor 22" determines a "medium bright object" because the real object brightness is between 'EV 12' and 'EV 14'.

Accordingly, the control circuit 202 causes the electromagnet 74 to be de-energized when the second switch plate 252 has been removed from the first independent plate 248a and becomes to contact the third switch plate 248c passing through the second switch plate 248b so that the third switch SW23 becomes to be turned on, upon rotation of the control plate 200. As a result, the lock pawl 72b of the lock lever 72 is rotated to urgingly contact the outer circumferential surface of the diaphragm disc 230 by the urging force of the spring 76. In other words, the lock pawl 72b is set to be capable of engaging the second groove 240b.

When the diaphragm disc 230 is further rotated upon rotation of the control plate 200 by '155' (='90' +'65') degrees from its resting position so that the second groove 240b comes to face to the lock pawl 72b, the lock pawl 72b comes to be engaged with the second groove 240b as shown in FIG. 11. Consequently, the rotation of the diaphragm disc 230 and the control plate 200 is stopped. In this stopped condition, the cam follower 12b contacts the first cam surface portion 228a of the lens driving cam surface 228 and the second diaphragm aperture 230b corresponding to 'f-8' is coaxially aligned with the photographing apertures 204 and 208.

As a result, the lens 14 is stayed in the position which is suitable for photographing an object at a distance of '3' meters corresponding to a "far object" and the diaphragm disc 230 is rotated to the position which defines the size of the aperture to 'f-8' corresponding to a "medium bright condition", and the strobe control circuit 94 inhibits the strobe 92 from flashing. Thereafter, the exposure of the film is executed by the shutter mechanism 212 when the release lever 214 is fully depressed.

Thirdly, a case wherein the real object distance is '5' meters and the real object brightness is 'EV 15' is considered. In this case, the object distance measuring sensor 20 determines a "far object" because the real object distance is more than '2.4' meters and the object brightness measuring sensor 22" determines a "bright object" because the real object brightness is more than 'EV 14'.

Accordingly, the control circuit 202 causes the electromagnet 74 to be de-energized when the second switch plate 252 has been removed from the first independent plate 248a to contact the fourth switch plate 248d passing through the second and third switch plates 248b and 248c so that the fourth switch SW24 becomes turned on, upon rotation of the control plate 200. As a result, the lock pawl 72b of the lock lever 72 is rotated and urgingly contacts the outer circumferential surface of the diaphragm disc 230 by the urging force of the spring 76. In other words, the lock pawl 72b is set to be capable of engaging the third groove 240c.

When the diaphragm disc 230 is further rotated upon rotation of the control plate 200 by '205' (='90' +'65' +'50') degrees from its resting position so that the third groove 240c comes to face to the lock pawl 72b, the lock pawl 72b comes to be engaged with the third groove 240c as shown in FIG. 12. Consequently, the rotation of the diaphragm disc 230 and the control plate 200 is stopped. In this stopped condition, the cam follower 12b contacts the first cam surface portion 228a of the lens driving cam surface 228 and the third diaphragm aperture 230c corresponding to 'f-16' is coaxially aligned with the photographing apertures 204 and 208.

As a result, the lens 14 is stayed in the position which is suitable for photographing an object at a distance of '3' meters corresponding to a "far object" and the diaphragm disc 230 is rotated to the position which defines the size of the aperture to 'f-16' corresponding to a "bright condition", and the strobe control circuit 94 inhibits the strobe 92 from flashing. Thereafter, the exposure of the film is executed by the shutter mechanism 212 when the release lever 214 is fully depressed.

Fourthly, a case wherein the real object distance is '2' meters and the real object brightness is 'EV 15' is considered. In this case, the object distance measuring sensor 20 determines a "near object" because the real object distance is less than '2.4' meters and the object brightness measuring sensor 22" determines a "bright object" because the real object brightness is more than 'EV 14'.

Accordingly, the control circuit 202 causes the electromagnet 74 to be de-energized when the second switch plate 252 has been removed from the first independent plate 248a to contact the fifth switch plate 248e passing through the second to fourth switch plates 248b to 248d so that the fifth switch SW25 becomes to be turned on, upon rotation of the control plate 200. As a result, the lock pawl 72b of the lock lever 72 is rotated to urgingly contact the outer circumferential surface of the diaphragm disc 230 by the urging force of the spring 76. In other words, the lock pawl 72b is set to be capable of engaging the fourth groove 240d.

When the diaphragm disc 230 is further rotated upon rotation of the control plate 200 by '270' (='90'+'65'+'50'+'65') degrees from its resting position so that the fourth groove 240d comes to face to the lock pawl 72b, the lock pawl 72b comes to be engaged with the fourth groove 240d as shown in FIG. 13. Consequently, the rotation of the diaphragm disc 230 and the control plate 200 is stopped. In this stopped condition, the cam follower 12b contacts the second cam surface portion 228b of the lens driving cam surface 228 and the fourth diaphragm aperture 230d corresponding to 'f-16' is coaxially aligned with the photographing apertures 204 and 208.

As a result, the lens 14 is moved to the position which is suitable for photographing an object at a distance of '2' meters corresponding to a "near object" and the diaphragm disc 230 is rotated to the position which defines the size of the aperture to 'f-16' corresponding to a "bright condition", and the strobe control circuit 94 inhibits the strobe 92 from flashing. Thereafter, the exposure to the film is executed by the shutter mechanism 212 when the release lever 214 is fully depressed.

Fifthly, a case wherein the real object distance is '2' meters and the real object brightness is 'EV 13' is considered. In this case, the object distance measuring sensor 20 determines a "near object" because the real object distance is less than '2.4' meters and the object brightness measuring sensor 22" determines a "medium bright object" because the real object brightness is between 'EV 12' and 'EV 14'.

Accordingly, the control circuit 202 causes the electromagnet 74 to be de-energized when the second switch plate 252 has been removed from the first independent plate 248a and becomes to contact the sixth switch plate 248f passing through the second to fifth switch plates 248b to 248e so that the sixth switch SW26 becomes to be turned on, upon rotation of the control plate 200. As a result, the lock pawl 72b of the lock lever 72 is rotated and becomes to urgingly contact the outer circumferential surface of the diaphragm disc 230 by the urging force of the spring 76. In other words, the lock pawl 72b is set to be capable of engaging the fifth groove 240e.

When the diaphragm disc 230 is further rotated upon rotation of the control plate 200 by '360' (='90' '65'+'50'+'65'+'90'; that is, just one revolution of the diaphragm disc 230) degrees from its resting position so that the fifth groove 240e comes to face to the lock pawl 72b, the lock pawl 72b comes to be engaged with the fifth groove 240e as shown in FIG. 14. Consequently, the rotation of the diaphragm disc 230 and the control plate 200 is stopped. In this stopped condition, the cam follower 12b contacts the second cam surface portion 228b of the lens driving cam surface 228 and the fifth diaphragm aperture 230e corresponding to 'f-8' is coaxially aligned with the photographing apertures 204 and 208.

As a result, the lens 14 is moved to the position which is suitable for photographing an object at a distance of '2' meters corresponding to a "near object" and the diaphragm disc 230 is rotated to the position which defines the size of the aperture to 'f-8' corresponding to a "medium bright condition", and the strobe control circuit 94 inhibits the strobe 92 from flashing. Thereafter, the exposure to the film is executed by the shutter mechanism 212 when the release lever 214 is fully depressed.

Finally and sixthly, a case wherein the real object distance is '2' meters and the real object brightness is 'EV 11' is considered. In this case, the object distance measuring sensor 20 determines a "near object" because the real object distance is less than '2.4' meters and the object brightness measuring sensor 22" determines a "dark object" because the real object brightness is less than 'EV 12 '.

Accordingly, the control circuit 202 causes the electromagnet 74 to be de-energized when the second switch plate 252 has been removed from the first independent plate 248a and becomes to contact the seventh switch plate 248g passing through the second to sixth switch plates 248b to 248f so that the seventh switch SW27 becomes to be turned on, upon rotation of the control plate 200. As a result, the lock pawl 72b of the lock lever 72 is rotated and becomes to urgingly contact the outer circumferential surface of the diaphragm disc 230 by the urging force of the spring 76. In other words, the lock pawl 72b is set to be capable of engaging the first groove 240a twice.

When the diaphragm disc 230 is further rotated upon rotation of the control plate 200 by '425' (='90'+'65'+50'+'65'+'90'+'65'; that is, more than one revolution of the diaphragm disc 230) degrees from its resting position so that the first groove 240a comes to face to the lock pawl 72b again, the lock pawl 72b comes to be engaged with the first groove 240a as shown in FIG. 15. Consequently, the rotation of the diaphragm disc 230 and the control plate 200 is stopped. In this stopped condition, the cam follower 12b contacts the second cam surface portion 228b of the lens driving cam surface 228 and the fifth diaphragm aperture 230e corresponding to 'f-4' is coaxially aligned with the photographing apertures 204 and 208.

As a result, the lens 14 is moved to the position which is suitable for photographing an object at a distance of '2' corresponding to a "near object" and the diaphragm disc 230 is rotated to the position which defines the size of the aperture to 'f-4' corresponding to a "dark object", and the strobe control circuit 94 allows the strobe 92 to flash. Thereafter, the exposure to the film is executed by the shutter mechanism 212 when the release lever 214 is fully depressed.

As mentioned above in detail, in the camera 10" of the third embodiment, the lens 14 can be moved to a position along its optical axis 0 that depends on the object distance (that is, auto-focus can be accomplished) and the aperture of the diaphragm mechanism 16" is set to an f-number that depends on the brightness of the object (that is, auto-exposure can be accomplished) by rotating only the control plate 200 in response to the shutter release operation, and stopping it at a predetermined position corresponding to the detected photographing control condition, as well as the first and second embodiments. In other words, in the camera 10" of the third embodiment, it is possible that the both of the distance between the lens 14 and the film according to the object distance and the f-number of the aperture of the diaphragm mechanism 16" according to the brightness of the object as the photographing control conditions are defined by rotating only the control plate 200 in response to the shutter release operation and the rotation of the diaphragm disc 230 is stopped at a predetermined position corresponding to the detected and present photographing control conditions.

Thus, it is not necessary to engage the rock pawl 72b with the predetermined one of the engaging teeth 60a to 60f as in the first embodiment (or 104a to 104i in the second embodiment) simultaneously with the de-energization of the electromagnet 74, but, for example, in the third embodiment, the timing of the de-energization of the electromagnet 74 in order to stop the rotation of the diaphragm disc 230 at a position of the third groove 240c should be defined after the second groove 240b has been passed through the lock pawl 72b and before the third groove 240c is faced to the lock pawl 72b. In other words, in the third embodiment, it is possible to de-energize the electromagnet 74 in advance rather than at a timing when the predetermined groove 240a to 240e faces to the lock pawl 72b, accordingly, the stop control in the third embodiment could be accomplished without accuracy.

The control circuit 202 only utilizes the information from the film sensitivity detecting sensor 24 for controlling the flash of the strobe 92 so that it automatically allows the flash of the strobe 92 when the object brightness detected by the object brightness measuring sensor 22" is less than EV 12 or the aperture is set to 'f-4' corresponding to a "dark condition" in the third embodiment. However, it is possible to flash the strobe 92 by considering the film sensitivity with another pattern. More specifically, it is possible to allow the strobe 92 to flash not only in the case of 'f-4' or "dark condition" but also in the case of 'f-8' or an "intermediate condition" where the "low sensitive film" is detected, or it is possible to inhibit the strobe 92 from flashing in the case of 'f-4' or a "dark condition" where the "high sensitive film" is detected.

The present disclosure relates to subject matters contained in Japanese Utility Model Application No. 4-93806 filed on Dec. 29, 1992 and Japanese Utility Model Application which is filed on Dec. 17, 1993 and has not yet assigned to its application number, which are expressly incorporated herein by reference in their entireties.

What is claimed is:

1. A camera comprising:

a lens, movable for focusing, and having a plurality of positions;

a focusing mechanism for moving said lens, and having a plurality of focus settings, each of said settings corresponding to a position of said lens;

an aperture mechanism, for setting a size of a diaphragm aperture of said lens through which a film is exposed, said aperture mechanism having a plurality of aperture settings and a plurality of positions, and each position of said aperture mechanism corresponding to a unique combination of aperture settings and focus settings such that the number of aperture mechanism positions equals the number of unique combinations of focus settings and aperture settings; and a focusing control mechanism, for controlling said focusing mechanism;

an aperture control mechanism, for controlling said aperture mechanism;

a movable control member that drives both said aperture control mechanism and said focusing control mechanism; and means for stopping said movable control member at one of a plurality of positions.

2. The camera according to claim 1, further comprising:

means for detecting a position of said movable control member.

3. The camera according to claim 2, further comprising a distance sensor for sensing a distance to an object to be photographed.

4. The camera according to claim 3, further comprising a controller and a brightness sensor for sensing a brightness of an object to be photographed, said aperture control mechanism controlling said aperture mechanism, and said controller controlling said stopping means to stop movement of said movable control member in response to said position detecting means when the position of said movable control member corresponds to one of said unique combinations of focusing settings and aperture settings, said unique combination corresponding to said distance to an object to be photographed detected by said distance sensor and to said object brightness detected by said brightness sensor.

5. The camera according to claim 1, said movable control member being linearly driven upon a shutter release operation.

6. The camera according to claim 1, said movable control member being rotatably driven upon a shutter release operation.

7. The camera according to claim 4, wherein said controller, based upon the distance to an object to be photographed detected by said distance sensor, categorizes the distance to an object to be photographed into one of a plurality of discrete distance categories; and said focusing control mechanism controls said focusing mechanism to move said photographing lens to a position corresponding to one of said discrete distance categories in accordance with the movement of said control member.

8. The camera according to claim 7, wherein said controller controls said stopping means to stop the movement of said movable control member when said position detecting means detects the position of the photographing lens as being set to a position corresponding to one of said discrete distance categories.

9. The camera according to claim 8, wherein said focusing control mechanism comprises first cam means formed on said movable control member for controlling said focusing mechanism to move said photographing lens between positions corresponding to said discrete distance categories.

10. The camera according to claim 4, wherein said controller, based upon the object brightness detected by said brightness sensor, categorizes the object brightness into one of a plurality of discrete brightness categories; and said aperture control mechanism controls said aperture mechanism to set said diaphragm aperture to a size corresponding to one of said discrete brightness categories in accordance with the movement of said control member.

11. The camera according to claim 10, said controller controlling said stopping means to stop the movement of said movable control member when said position detecting means detects the diaphragm aperture as being set to a size corresponding to one of said discrete brightness categories.

12. The camera according to claim 11, wherein said movable control member is linearly driven upon a shutter release operation.

13. The camera according to claim 12, wherein said aperture control mechanism comprises second cam means formed in said movable control member for controlling said aperture mechanism to move said diaphragm aperture positions corresponding to said discrete brightness categories.

14. The camera according to claim 11, wherein said movable control member is rotatably driven upon a shutter release operation.

15. The camera according to claim 14, said aperture control mechanism including a rack formed on said movable control member and a pinion gear that is engaged with said rack and rotates upon rotation of said control member;

said aperture mechanism including a diaphragm plate to which said pinion gear is coaxially fixed and which is rotated in association with rotation of said movable control member, said diaphragm plate having a plurality of diaphragm apertures corresponding to said discrete brightness categories; and each of said plurality of said diaphragm apertures being alignable with said lens upon the rotation of said diaphragm plate in association with rotation of said movable control member.

16. The camera according to claim 15, said diaphragm plate being formed into the shape of a disc;

said stopping means including a lock pawl engageable with said diaphragm plate in order to stop the rotation of said diaphragm plate and said movable control member; and said diaphragm plate being formed with a plurality of grooves on an outer periphery of said diaphragm plate, each of said grooves being formed in a position corresponding to a position of said diaphragm plate such that one of said diaphragm apertures is aligned with said lens, said lock pawl being engageable with a selected one of said plurality of grooves to stop the rotation of said diaphragm plate at one of said positions, whereby one of said diaphragm apertures is aligned with said lens.

17. The camera according to claim 16, said stopping means including an urging member for urging said lock pawl to contact the outer periphery of said diaphragm plate and an electromagnet energizable to attract said lock pawl away from the outer periphery of said diaphragm plate; and said controller controlling said electromagnet to be energized so that the lock pawl is attracted away and separated from the outer periphery of said diaphragm plate against the urging force of said urging member when the shutter release operation is initiated, and controlling the electromagnet to be de-energized so that the lock pawl contacts the outer periphery of said diaphragm plate by the urging force of said urging member when the rotation of said diaphragm plate is stopped.

18. The camera according to claim 1, said movable control member being movable in a single direction, upon a shutter release operation, for driving both said aperture control mechanism and said focusing control mechanism.

19. A camera comprising:

a release lever which is moved in one direction upon a shutter release operation;

a movable control member urged into contact with said release lever in said one direction and movable in said one direction in accordance with the movement of said release lever;

cam means arranged on said control member and having a first cam surface for defining a position of a photographing lens along an optical axis of the photographing lens, corresponding to a first object distance and a second cam surface for defining a position of the photographing lens along the optical axis, corresponding to a second object distance;

a rack formed on said control member;

a pinion meshing with said rack and rotating upon movement of said control member;

a diaphragm plate which is fixed to said pinion and which is supported for rotation in association with rotation of said pinion;

a plurality of diaphragm apertures formed on said diaphragm plate and successively alignable with a photographing aperture upon rotation of said diaphragm plate;

a plurality of latch portions formed on an outer periphery of said diaphragm plate, each of said latch portions corresponding to a position of said diaphragm plate where one of said diaphragm apertures is aligned with the photographing aperture;

means for stopping rotation of said diaphragm plate by engaging with one of said latch portions;

means for detecting a distance to an object to be photographed and a brightness of the object; and means for controlling said stopping means so that said control member and said diaphragm plate stop in a position where said position of the photographing lens along the optical axis and one of said diaphragm apertures aligned with said photographing aperture correspond to the distance to the object and the brightness of the object detected by said detecting means, when the shutter release operation is executed.

20. The camera according to claim 19, wherein said control member is rotatably supported and rotated upon the movement of said release lever.

21. The camera according to claim 19, further comprising:

a first urging member for urging said release lever in a direction opposite to said one direction; and a second urging member for urging said control member to contact said release lever.

22. The camera according claims 19, said moveable control member being moveable, when the shutter release operation is performed, in a single direction, to position said photographing lens in one of said positions along the optical axis of said photographing lens and to position one of said diaphragm apertures in alignment with said photographing aperture.

23. A camera comprising:

a lens, movable for focusing into a plurality of positions along an optical axis;

a focusing guide cam, for moving said lens, and having a plurality of cam levels, each of said levels corresponding to a position of said lens;

an aperture guide cam, for setting the size of an aperture through which a film is exposed, said aperture guide cam having a plurality of levels and a plurality of discrete positions, each discrete position of said aperture guide cam corresponding to a unique combination of a level of said aperture guide cam and a level of said focusing guide cam, such that the number of discrete aperture guide cam positions equals the number of unique combinations of focusing guide cam levels and aperture guide cam levels;

a control member in which both of said aperture guide cam and said focusing guide cam are formed; and means for stopping said control member at one of a plurality of positions.

24. The camera according to claim 23, wherein said control member is moveable in a single direction, upon a shutter release operation, for driving both said aperture guide cam and said focusing guide cam.

25. A camera comprising:

a lens, movable for focusing into a plurality of positions;

a focusing guide cam, for moving said lens, and having a plurality of cam levels, each of said levels corresponding to a position of said lens;

a rotatable aperture mechanism, for setting the size of an aperture through which a film is exposed, said aperture mechanism having a plurality of settings and a plurality of angular positions corresponding to said settings, and rotatable in a full rotation for each level of said focusing guide cam;

a control member that drives both said rotatable aperture mechanism and said focusing guide cam such that said rotatable aperture mechanism is fully rotated for every level of said focusing guide cam, a range of movement of said control member including all unique combinations of rotatable aperture mechanism angular positions and focusing guide cam levels; and means for stopping said control member at one of a plurality of positions.

26. The camera according to claim 25, said control member being moveable in a single direction, upon a shutter release operation for driving both of said rotatable aperture mechanism and said focusing guide cam.

27. A camera comprising:

a lens, moveable for focusing into a plurality of positions along an optical axis;

a focusing mechanism for moving said lens into each of said plurality of positions;

an aperture mechanism for setting a size of an aperture through which a film is exposed;

a control member mounted for movement in said camera;

means for moving said control member in a single direction, upon a shutter release operation, for driving said focusing mechanism and said aperture mechanism to move said lens into one of said positions and to set a size of an aperture;

means for stopping said control member at one of a plurality of positions for selecting a position of said lens along the optical axis and for selecting a size of an aperture through which a film is exposed from among a plurality of apertures.

28. The camera according to claim 27, said control member being driven, by said moving means, to move linearly in said single direction upon a shutter release operation.

29. The camera according to claimed 27, said control member being driven, by said moving means, to rotate in said single direction upon a shutter release operation.

30. The camera according to claim 27, further comprising a distance sensor for sensing a distance to an object to be photographed.

31. The camera according to claim 30, said distance sensor comprising a code plate.

32. The camera according to claim 27, said focusing mechanism and said aperture mechanism each comprising a cam surface.

* * * * *